(12) United States Patent
Kondou

(10) Patent No.: US 11,531,839 B2
(45) Date of Patent: Dec. 20, 2022

(54) LABEL ASSIGNING DEVICE, LABEL ASSIGNING METHOD, AND COMPUTER PROGRAM PRODUCT

(71) Applicants: KABUSHIKI KAISHA TOSHIBA, Tokyo (JP); TOSHIBA DIGITAL SOLUTIONS CORPORATION, Kawasaki (JP)

(72) Inventor: Masaki Kondou, Ota (JP)

(73) Assignees: KABUSHIKI KAISHA TOSHIBA, Tokyo (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 45 days.

(21) Appl. No.: 17/142,372

(22) Filed: Jan. 6, 2021

(65) Prior Publication Data

US 2021/0124997 A1    Apr. 29, 2021

Related U.S. Application Data

(63) Continuation of application No. PCT/JP2019/008197, filed on Mar. 1, 2019.

(30) Foreign Application Priority Data

Jul. 11, 2018    (JP) .............................. JP2018-131457

(51) Int. Cl.
*G06K 9/62* (2022.01)

(52) U.S. Cl.
CPC ......... *G06K 9/6256* (2013.01); *G06K 9/6215* (2013.01); *G06K 9/6218* (2013.01); *G06K 9/6228* (2013.01); *G06K 9/6232* (2013.01)

(58) Field of Classification Search
CPC ........................... G06F 16/908; G06K 9/6218
See application file for complete search history.

(56) References Cited

U.S. PATENT DOCUMENTS

2013/0113877 A1* 5/2013 Sukthankar ............ G06V 20/46
348/E13.001

FOREIGN PATENT DOCUMENTS

| JP | 3602765 B2 | 12/2004 |
| JP | 2016-081265 A | 5/2016 |

OTHER PUBLICATIONS

Ushiku, Y. et al. "Common Subspace for Model and Similarity: Phrase Learning for Caption Generation from Images." 2015 IEEE International Conference on Computer Vision (ICCV) (2015): 2668-2676. (Year: 2015).*

(Continued)

*Primary Examiner* — Ross Varndell
(74) *Attorney, Agent, or Firm* — Maier & Maier, PLLC

(57) ABSTRACT

A label assigning device of an embodiment includes one or more hardware processors configured to function as a label candidate generation unit, a feature amount pair detection unit, and a label assigning unit. The label candidate generation unit generates a label candidate from association data associated with a content. The feature amount pair detection unit detects a feature amount pair that is a combination of feature amounts having a highest similarity among combinations of a feature amount extracted from a first content and a feature amount extracted from a second content. The label assigning unit assigns, as a label, a common label candidate generated from both first association data associated with the first content and second association data associated with the second content to each feature amount constituting the feature amount pair.

15 Claims, 19 Drawing Sheets

(56) References Cited

OTHER PUBLICATIONS

Ushiku et al., "Common Subspace for Model and Similarity: Phrase Learning for Caption Generation From Images", ICCV 2015, pp. 2668-2676.
"MeCab: Yet Another Part-of-Speech and Morphological Analyzer", http://mecab.sourceforge.net/, Mar. 26, 2018, 24 pages (with English Machine Translation).
Mikolov et al., "Efficient Estimation of Word Representations in Vector Space", ICIL 2013, Sep. 7, 2013, 12 pages.
Pennington et al., "GloVe: Global Vectors for Word Representation", Proceedings of the 2014 Conference on Empirical Methods in Natural Language Processing (EMNLP), 2014, pp. 1532-1543.

* cited by examiner

FIG.4
MOVING IMAGE A     MOVING IMAGE B
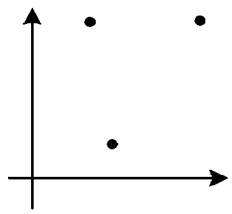 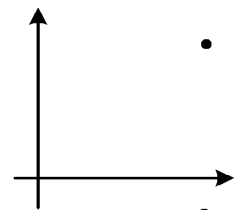
PERSON a, PERSON b,    PERSON a, PERSON d,
PERSON c               PERSON e
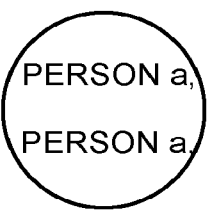 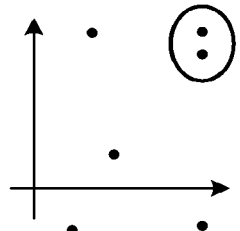
PERSON a, PERSON b, PERSON c
PERSON a, PERSON d, PERSON e
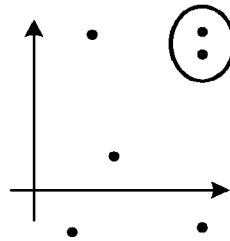
— PERSON a
MOVING IMAGE A     MOVING IMAGE B
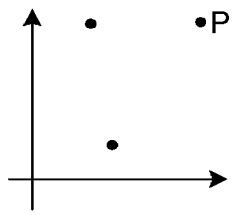 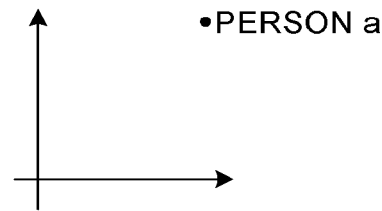
•PERSON a         •PERSON a

FIG.5
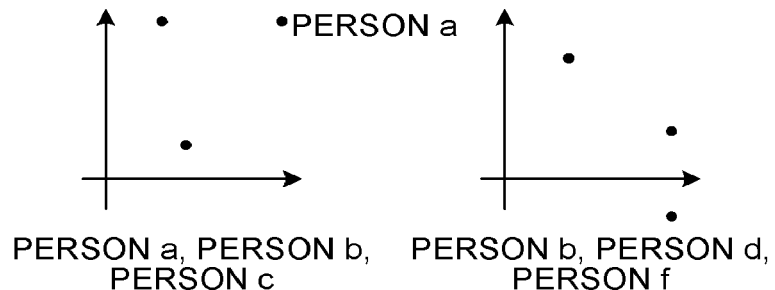
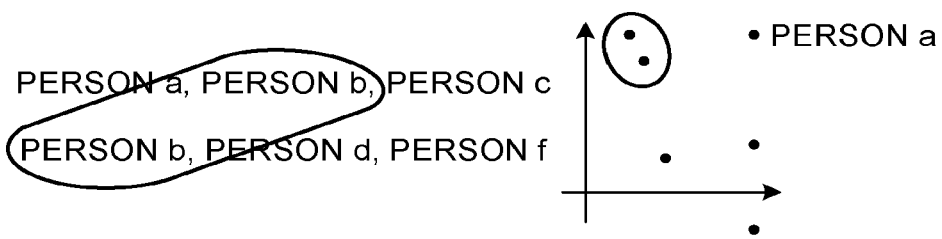
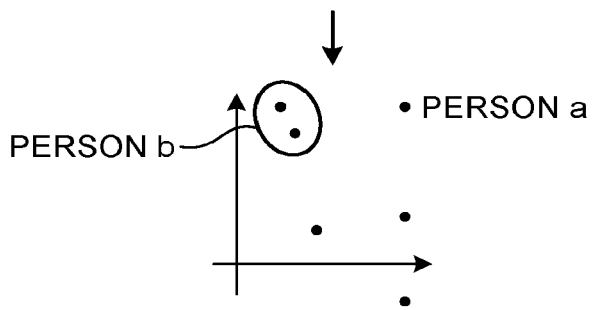
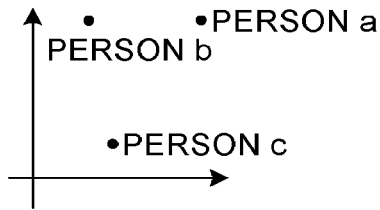
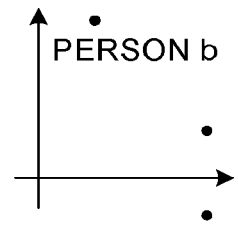

FIG.12
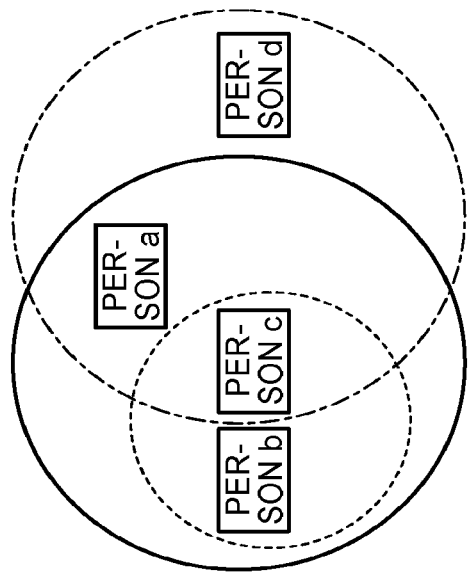
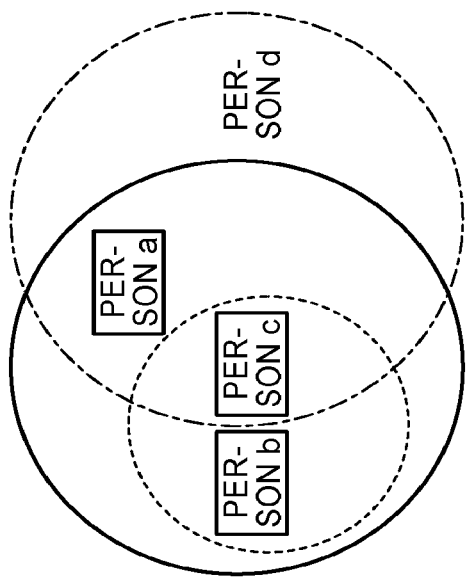
AUTOMATIC LABEL ASSIGNING IS POSSIBLE BECAUSE PERSON d IS UNIQUELY SPECIFIED

LABEL ASSIGNING DEVICE, LABEL ASSIGNING METHOD, AND COMPUTER PROGRAM PRODUCT

CROSS-REFERENCE TO RELATED APPLICATIONS

This application is a continuation of PCT International Application No. PCT/JP2019/008197 filed on Mar. 1, 2019 which claims the benefit of priority from Japanese Patent Application No. 2018-131457, filed on Jul. 11, 2018, the entire contents of which are incorporated herein by reference.

FIELD

Embodiments described herein relate to a label assigning device, a label assigning method, and a computer program product.

BACKGROUND

Along with the progress of storage performance and communication line technologies, opportunities increase for searching and utilizing a desired content from among a large number of contents retained in a local storage device, a database server on a network, and the like. Keyword search is the simplest and highly convenient content search. When a label equivalent to a keyword is assigned to a feature amount extracted from a content, a desired content can be highly accurately searched by keyword search. In a case of a moving image content, it is possible to perform, for example, scene search to find a scene in which a person specified by a keyword appears. However, it is extremely cumbersome to manually assign a label to each feature amount extracted from a content, and thus technologies capable of automatically performing such label assigning have been desired.

The present disclosure is intended to provide a label assigning device, a label assigning method, and a computer program product that are capable of automatically assigning a label to a feature amount extracted from a content.

BRIEF DESCRIPTION OF THE DRAWINGS

FIG. 4 is a diagram for explaining processing of detecting a vector pair from a moving image pair and assigning a label to the vector pair;

FIG. 5 is a diagram for explaining the processing of detecting a vector pair from a moving image pair and assigning a label to the vector pair;

FIG. 12 is a diagram for explaining an outline of the processing of the third embodiment;

DETAILED DESCRIPTION

A label assigning device of an embodiment includes one or more hardware processors configured to function as a label candidate generation unit, a feature amount pair detection unit, and a label assigning unit. The label candidate generation unit generates a label candidate from association data associated with a content. The feature amount pair detection unit detects a feature amount pair that is a combination of feature amounts having a highest similarity among combinations of a feature amount extracted from a first content and a feature amount extracted from a second content. The label assigning unit assigns, as a label, a common label candidate generated from both first association data associated with the first content and second association data associated with the second content to each feature amount constituting the feature amount pair. An embodiment of a label assigning device, a label assigning method, and a computer program product will be described below in detail with the accompanying drawings.

Outline of Embodiments

The present embodiment automatically assigns a label to a feature amount extracted from a content. Examples of contents assumed in the present embodiment include data in various formats, such as a moving image, a stationary image, voice, and sensor data. In the present embodiment, candidates for labels to be assigned to feature amounts extracted from these contents are generated by using association data associated with the contents. Association data may be text data provided to a content in advance, such as content description or subtitle information or may be text data obtained by performing given processing such as voice recognition, letter/character recognition, or image description (explanation) generation (captioning) on the content.

When one feature amount is extracted from a content and one label candidate is generated from association data, the correspondence relation between the feature amount and the label can be uniquely specified. However, such a situation is extremely rare, and typically, plural feature amounts are extracted from a content, and plural label candidates are generated from association data generally. In such cases, which label candidate corresponds to which feature amount cannot be uniquely specified, and thus a label cannot be automatically assigned to a feature amount. Thus, in the present embodiment, plural data sets of a content and association data are used to specify the correspondence relation between a feature amount and a label candidate using a common portion between the data sets as a clue.

Figure 1:
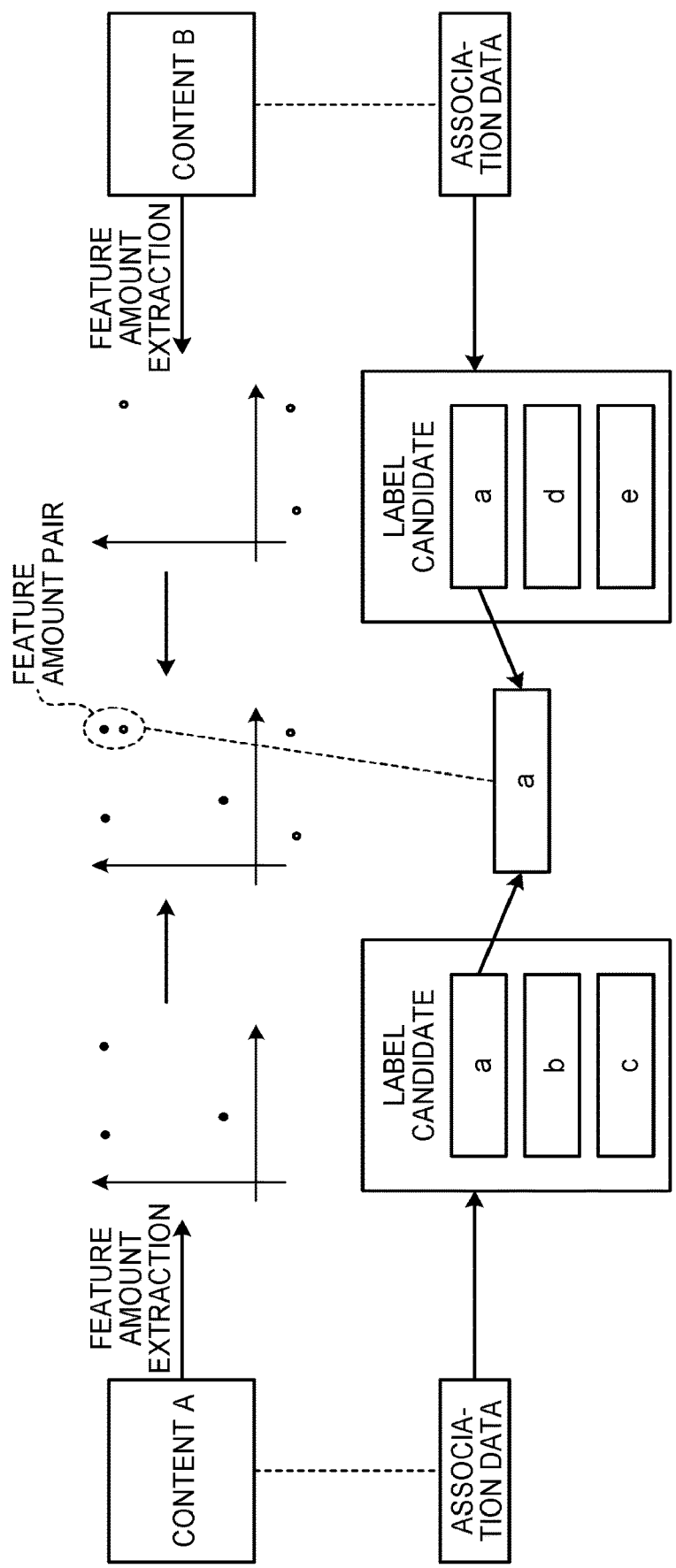
FIG. 1 is a diagram for explaining a basic concept of an embodiment.

FIG. 1 is a diagram for explaining a basic concept of the embodiment. As illustrated in FIG. 1, Content A and Content B are exemplar contents each associated with association data. Here, three feature amounts are extracted from each of Content A and Content B. Three label candidates "a", "b", and "c" are generated from the association data of Content A, and three label candidates "a", "d", and "e" are generated from the association data of Content B. Namely, the data set of Content A and the association data thereof and the data set of Content B and the association data thereof have only one common label candidate generated from the association data. In this manner, a combination of data sets having only one common label candidate generated from association data is selected in the present embodiment.

In the present embodiment, processing of extracting feature amounts from each of Contents A and B and processing of generating label candidates from each association data are performed first. Thereafter, the feature amounts extracted from Content A and the feature amounts extracted from Content B are mapped in a common feature amount space. Then, a combination of feature amounts having the highest similarity (for example, a combination of feature amounts having the shortest distance) among combinations of a feature amount extracted from Content A and a feature amount extracted from Content B is detected as a feature amount pair. The feature amount pair detected in this manner is highly likely to represent a common (identical) target included in both Content A and Content B. Thus, a common label candidate (label candidate "a" in the example illustrated in FIG. 1) generated from both the association data of Content A and the association data of Content B is assigned as a label to each feature amount constituting the feature amount pair.

In the above-described processing, since one feature amount pair is detected from Content A and Content B and a label is assigned to each feature amount constituting the feature amount pair, Contents A and B each still have a feature amount to which a label is yet to be assigned. However, for each of Contents A and B, a label can be assigned in the same manner to a feature amount to which a label is yet to be assigned by selecting a combination with another data set and repeating the above-described processing. Once labels are assigned to a large number of feature amounts by repeating the above-described processing by using a large number of data sets, a label can be automatically assigned by nearest neighbor search to a feature amount extracted from a content not associated with association data. Specifically, when a feature amount extracted from a content not associated with association data is sufficiently close to a feature amount to which a label is already assigned, the same label can be assigned to the feature amount extracted from a content not associated with association data.

A specific example to which the concept of the present embodiment is applied will be described below in detail with a simple example in which a content is a TV program (moving image) and association data is program description of the contents of the TV program. In the following description, components having the same function are denoted by an identical reference sign, and any duplicate description thereof is omitted as appropriate.

First Embodiment

A TV program is typically provided as a set of a moving image and program description. The program description is text data describing the contents of the TV program and often includes the names of main characters (persons) appearing in the TV program. In the present embodiment, the name of a main character, which is obtained from the program description, is automatically assigned as a label to a face feature representative vector (exemplary representative feature amount) of the main character, which is obtained from the moving image of the TV program.

The following first describes an outline of processing of the present embodiment. In the present embodiment, face detection and face feature vector generation processing is performed on each frame of the moving image of a TV program. In this case, since a main character of the TV program frequently appears in the TV program, a large number of face feature vectors thereof are extracted from the moving image. Face feature vectors of an identical person, which are extracted from the moving image exist close to each other in a feature vector space. In other words, it is considered that a larger number of face feature vectors of a main character, which are extracted from the moving image exist in the feature vector space and are densely positioned. Since a person (non-main character) other than the main character less frequently appears, it is considered that the density of face feature vectors thereof in the feature vector space is low. Thus, face feature vectors that are sparse in the feature vector space are taken as outliers, and K-means clustering with K=the number of main characters is performed on face feature vector groups in the feature vector space, thereby obtaining the face feature representative vector of a main character.

Plural TV programs have a common main character. A main character who is common to the TV programs is referred to as a common character below. In this case, common characters can be narrowed down by appropriately selecting a combination of TV programs. For example, when there are TV program X in which Person a and Person b appear as main characters and TV program Y in which Person a and Person c appear as main characters, Person a is a common character that can be obtained based on the combination of TV program X and TV program Y.

In the present embodiment, first, the face feature representative vector of a main character is generated for each TV program by performing the above-described K-means clustering on face feature vectors extracted from the moving image of the TV program. In this case, since plural main characters often appear in one TV program, a face feature representative vector and the name of a main character cannot be uniquely associated. Thus, a combination of plural TV programs having one common character is selected, and face feature representative vectors generated from the moving images of the respective TV programs are mapped in a common feature vector space. For example, plural face feature representative vectors generated from a first moving image and plural face feature representative vectors generated from a second moving image are mapped in a common feature vector space when the first moving image is the moving image of one of two TV programs having one common character and the second moving image is the moving image of the other TV program.

Since the two TV programs have one common character, a combination (exemplary feature amount pair; hereinafter referred to as a vector pair) of face feature representative vectors having the highest similarity among combinations of a face feature representative vectors generated from the first moving image and a face feature representative vector generated from the second moving image is highly likely to belong to the common character. Thus, the name of the common character can be assigned as a label to each face feature representative vector constituting the vector pair. Although the following describes an example in which the similarity between face feature representative vectors is determined by using the distance (for example, the Euclidean distance) between the face feature representative vectors, the similarity may be determined by using the inner product of the two face feature representative vectors. When the similarity is determined by using the distance between the face feature representative vectors, the similarity is higher as the distance is shorter. When the similarity is determined by using the inner product of the two face feature representative vectors, the similarity is higher as the inner product is larger.

Figure 2:
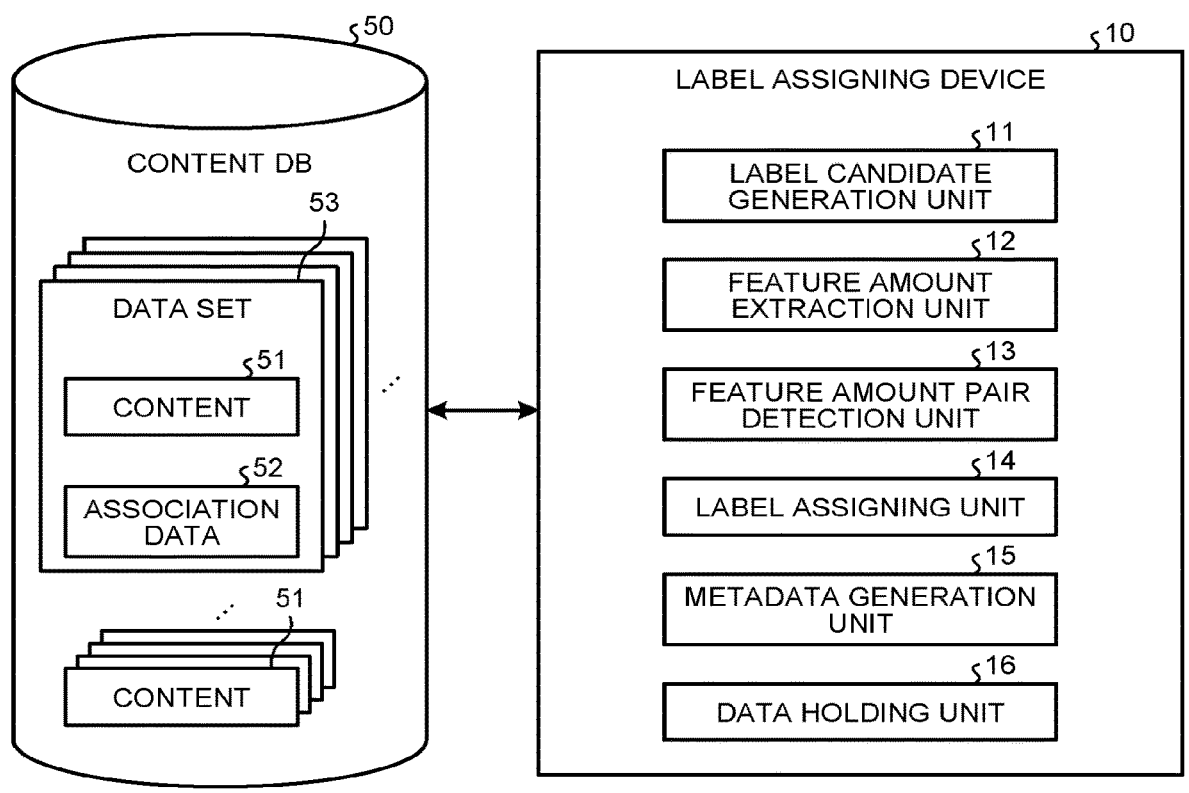
FIG. 2 is a block diagram illustrating an exemplary functional configuration of a label assigning device according to a first embodiment.

The following describes the configuration of a label assigning device according to the present embodiment. FIG. 2 is a block diagram illustrating an exemplary functional configuration this label assigning device 10 according to the present embodiment. As illustrated in FIG. 2, the label assigning device 10 includes a label candidate generation unit 11, a feature amount extraction unit 12, a feature amount pair detection unit 13, a label assigning unit 14, a metadata generation unit 15, and a data holding unit 16.

The label assigning device 10 extracts a feature amount from a content 51 stored in a content DB 50 and assigns, as a label, any of label candidates generated from association data 52 to the extracted feature amount. In the present embodiment, as described above, a data set 53 as the combination of the content 51 and the association data 52 is a TV program, the content 51 is the moving image of the TV program, and the association data 52 is the program description thereof.

The label candidate generation unit 11 generates label candidates from the association data 52 associated with the content 51. For example, when the association data 52 is the program description of a TV program, the label candidate generation unit 11 performs morpheme analysis on the program description, acquires the name of any main character appearing in the TV program from a result thereof, and sets the name as a label candidate. The association data 52 may be any text data from which the name of a main character as a label candidate can be acquired, and for example, may be text data obtained by performing voice recognition processing on voice linked with the moving image or may be text data obtained by applying, to a frame image included in the moving image, for example, a conventional image description generation technology. Text data of subtitle information applied to the moving image may be used as the association data 52.

The feature amount extraction unit 12 extracts feature amounts from the content 51. For example, when the content 51 is the moving image of a TV program, the feature amount extraction unit 12 performs face detection and face feature vector generation processing on each frame of the moving image. Accordingly, face feature vectors of all characters (persons) appearing in the TV program are obtained. The technology of detecting a face from an image and extracting the feature amount (face feature vector) thereof is widely known, and thus detailed description thereof is omitted.

When the content 51 as a processing target is associated with the association data 52, the feature amount extraction unit 12 clusters feature amount groups extracted from the content 51 and generates the representative feature amount for each cluster. For example, when the content 51 is the moving image of a TV program and the moving image is associated with the program description thereof as the association data 52, the feature amount extraction unit 12 performs K-means clustering on face feature vector groups extracted from the moving image and generates the face feature representative vector for each cluster. The value K in the K-means clustering is the number of label candidates generated by the label candidate generation unit 11, in other words, the number of main characters appearing in the TV program. Accordingly, face feature representative vectors in a number equal to the number of main characters are obtained. When the number of feature amounts extracted from the content 51 is equivalent to the number of label candidates, clustering of the feature amounts (representative feature amount generation) does not need to be performed.

A list of label candidates (main character names) generated by the label candidate generation unit 11 and plural face feature representative vectors (representative feature amounts) generated by the feature amount extraction unit 12 are held in the data holding unit 16 as intermediate processing data in the present embodiment in association with identification information of the content 51 (moving image of a TV program).

The feature amount pair detection unit 13 detects a feature amount pair by using a combination of data sets 53 having only one common label candidate generated from the association data 52 among data sets 53 stored in the content DB 50. For example, each data set 53 stored in the content DB 50 is a TV program, the content 51 is the moving image of the TV program, and the association data 52 is the program description thereof. For each data set 53, a list of the names of main characters is generated as the list of label candidates by the label candidate generation unit 11, and face feature representative vectors in a number equal to the number of main characters are generated as representative feature amounts by the feature amount extraction unit 12. In this case, the feature amount pair detection unit 13 selects a combination of TV programs having one common main character among the TV programs stored as data sets 53 in the content DB 50. Then, the feature amount pair detection unit 13 detects, as a vector pair, a combination of face feature representative vectors having the shortest distance (the highest similarity) among combinations of a face feature representative vector generated from a first moving image and a face feature representative vector generated from a second moving image when the first moving image is the moving image of one of the TV programs and the second moving image is the moving image of the other TV program.

In the present embodiment, it is assumed that a larger number of feature amounts (face feature vectors) representing an identical target (main character) are extracted from the single content 51 (the moving image of a TV program), and the feature amount extraction unit 12 clusters the feature amounts extracted from the content 51. However, when a label is to be assigned to each feature amount extracted from the content 51, feature amount clustering (representative feature amount generation) is unnecessary. In this manner, when the feature amount extraction unit 12 does not perform feature amount clustering, the feature amount pair detection unit 13 may determine the similarity of a combination of feature amounts, not representative feature amounts, and detect a feature amount pair.

The label assigning unit 14 assigns, as a label, a common label candidate generated from each association data 52 included in a combination of data sets 53 to each feature amount constituting a feature amount pair detected by the feature amount pair detection unit 13. For example, when a vector pair is detected by the feature amount pair detection unit 13 as described above, the name of a common main character is assigned as a label to each face feature representative vector of the vector pair.

When a feature amount (face feature vector) extracted from the content 51 not associated with the association data 52 is similar to each feature amount (face feature representative vector) of the feature amount pair (vector pair) detected by the feature amount pair detection unit 13, the label assigning unit 14 can assign, to the feature amount extracted from the content 51 not associated with the association data 52, a label same as the label assigned to each feature amount constituting the feature amount pair. This processing can be achieved by, for example, a nearest neighbor search method to be described later.

The metadata generation unit 15 generates metadata of the content 51 by using a feature amount to which a label is assigned. For example, when a face feature vector is extracted from each frame of a moving image by the feature amount extraction unit 12 as described above, the correspondence relation between the extracted face feature vector and the frame number is recorded. Thereafter, when a label is assigned to the face feature vector by the label assigning unit 14, the label assigned to the face feature vector can be assigned to the frame number from which the face feature vector is extracted. The label assigned to the frame number serves as metadata for searching a TV program for a scene in which a desired main character appears.

Figure 3:
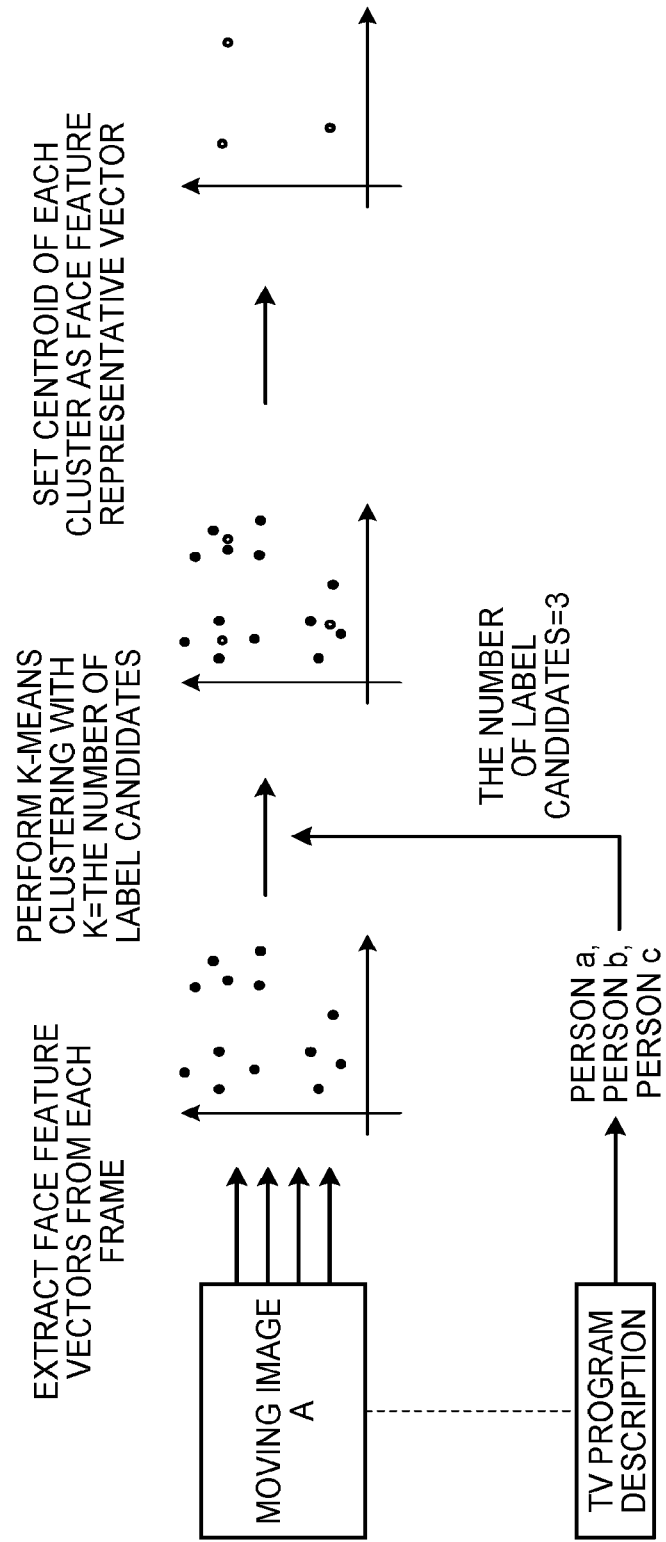
FIG. 3 is a diagram for explaining processing of extracting face feature vectors from a moving image and generating a face feature representative vector.

The following describes a specific example of processing by the label assigning device 10 according to the present embodiment. First, processing of generating the face feature representative vector of a main character of a TV program and a main character list will be described below with reference to FIG. 3. FIG. 3 is a diagram for explaining processing of extracting face feature vectors from a moving image and generating a face feature representative vector.

The label candidate generation unit 11 performs morpheme analysis on the program description of the TV program. Then, the name of any main character appearing in the TV program is acquired as a label candidate from a result of the morpheme analysis, and a main character list is generated. The number of main characters included in the main character list is the number of label candidates. FIG. 3 illustrates an example in which the names of main characters of Person a, Person b, and Person c are acquired as label candidates from program description associated with Moving image A. The morpheme analysis on program description may employ, for example, conventional MeCab.

As illustrated in FIG. 3, the feature amount extraction unit 12 performs character face detection on each frame of Moving image A of the TV program and generates face feature vectors. Accordingly, plural persons and plural face feature vector groups are generated from one Moving image A. In other words, the face feature vectors of all persons appearing in the TV program are covered.

Subsequently, the feature amount extraction unit 12 performs K-means clustering on the face feature vector groups generated from Moving image A and sets the centroid of each cluster as a face feature representative vector. The value K in this case is the number of label candidates generated by the label candidate generation unit 11, in other words, the number of main character names included in the main character list. Accordingly, face feature representative vectors in the number equal to the number of main characters appearing in the TV program are obtained. In FIG. 3, three face feature representative vectors are obtained. Each face feature representative vector is considered to be a feature amount representing a main character included in the main character list. However, the group of face feature vectors generated from Moving image A potentially includes a person (non-main character) other than a main character. Thus, the face feature vector of the non-main character is removed by performing processing as described below.

First, the distance between a face feature representative vector and each face feature vector belonging to an identical cluster is calculated. A vector, the distance of which is statistically an outlier is considered to belong to a person (non-main character) having a label different from that of the face feature representative vector. Thus, such a vector is considered as an "outlier vector".

Subsequently, after any outlier vector is removed, K-means clustering is performed again.

This processing is repeated until a result of the clustering converges (until the number of outlier vectors becomes zero). Then, the maximum distance in each cluster when the clustering result has converged is recorded in the data holding unit 16 in association with a face feature representative vector that is the centroid of the cluster. This value is used as a threshold value at nearest neighbor search in metadata generation to be described later.

Through the processing so far, the face feature representative vector of each main character in the moving image and the main character list are generated. However, in this state, the correspondence between a face feature representative vector and a main character cannot be determined except for a special case in which there are only one face feature representative vector and one main character. Accordingly, a label to a face feature vector cannot be automatically assigned. Thus, the correspondence relation between a face feature representative vector and a main character is narrowed down by using plural data sets 53 in combinations. Thus, the above-described processing (1) to (3) is performed for any other TV program stored as a data set 53 in the content DB 50 to generate the face feature representative vector of each main character in the moving image thereof and a main character list. Then, a combination of TV programs having one common character is selected.

In this embodiment, three face feature representative vectors are generated from each of Moving images A, B, and C of three TV programs. In addition, it is assumed that Person a, Person b, and Person c are generated as label candidates from program description associated with Moving image A, Person a, Person d, and Person e are generated as label candidates from program description associated with Moving image B, and Person b, Person d, and Person f are generated as label candidates from program description associated with Moving image C. In this case, Moving image A and Moving image B have one common character of Person a, Moving image A and Moving image C have one common character of Person b, and Moving image B and Moving image C have one common character of Person d.

In the present embodiment, the correspondence relation between a face feature representative vector and a main character is narrowed down by using these combinations of TV-program moving images having one common character. In this embodiment, combinations (hereinafter referred to as moving image pairs) of two moving images are used but combinations of three or more moving images may be used.

Figure 6:
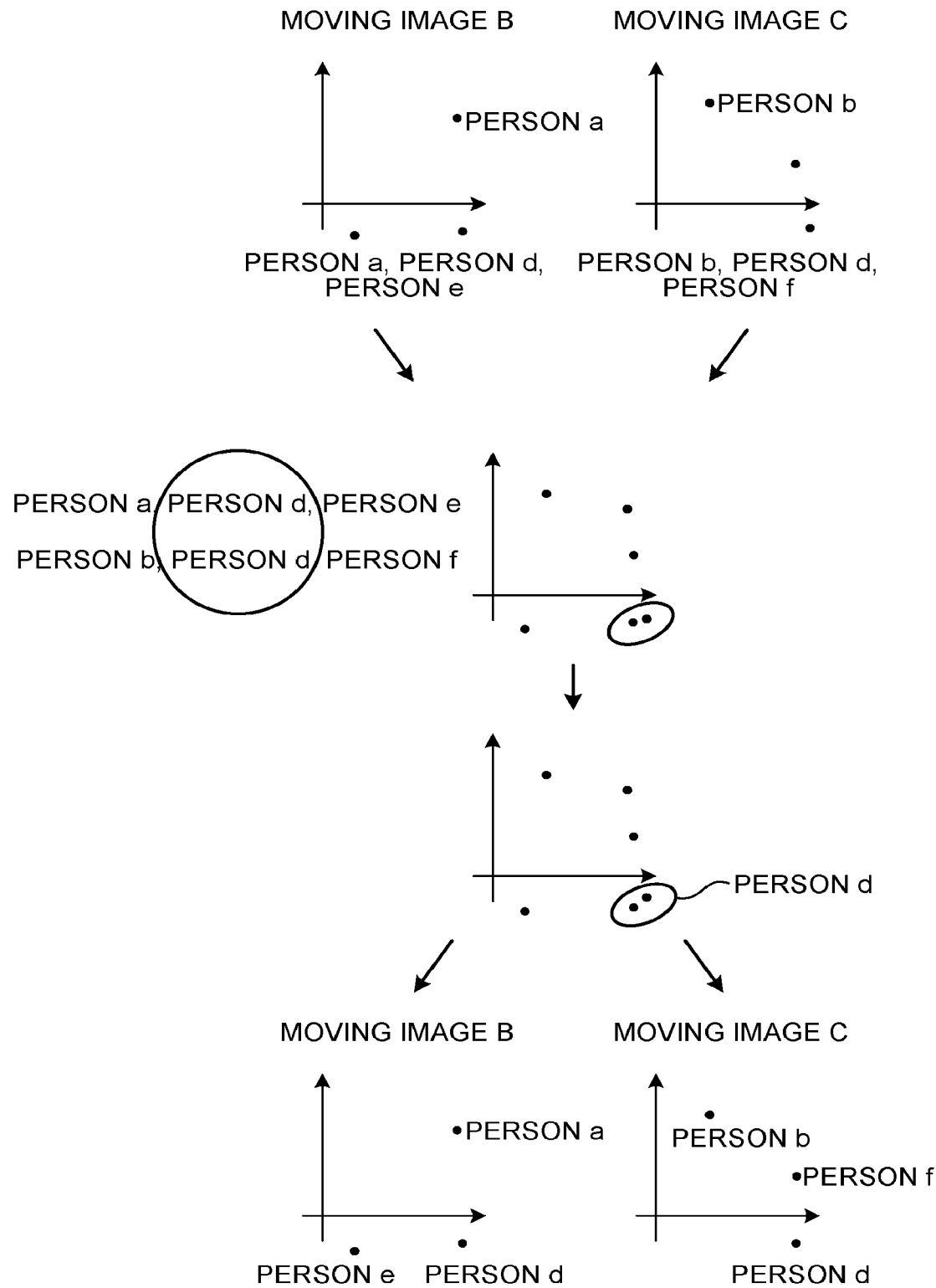
FIG. 6 is a diagram for explaining the processing of detecting a vector pair from a moving image pair and assigning a label to the vector pair.

The following describes, with reference to FIGS. 4 to 6, processing of narrowing down the correspondence relation between a face feature representative vector and a main character by using an above-described moving image pair. FIGS. 4 to 6 are diagrams for explaining processing of detecting a vector pair from a moving image pair and assigning a label to the vector pair.

First, as illustrated in FIG. 4, the feature amount pair detection unit 13 selects a moving image pair of Moving image A and Moving image B and maps, in a common feature vector space, three face feature representative vectors generated from Moving image A and three face feature representative vectors generated from Moving image B. Then, the feature amount pair detection unit 13 detects a vector pair as a combination of face feature representative vectors having the shortest distance among combinations of a face feature representative vector generated from Moving image A and a face feature representative vector generated from Moving image B. Typically, face feature vectors of an identical person are positioned close to each other. Thus, the two face feature representative vectors of the vector pair detected from the moving image pair of Moving image A and Moving image B can be estimated as face feature representative vectors of Person a, who is a common character of Moving image A and Moving image B. Thus, the label assigning unit 14 assigns the label of Person a to the two face feature representative vectors constituting the vector pair.

Subsequently, as illustrated in FIG. 5, the feature amount pair detection unit 13 selects a moving image pair of Moving image A and Moving image C and maps, in a common feature vector space, the three face feature representative vectors generated from Moving image A and three face feature representative vectors generated from Moving image C. Then, the feature amount pair detection unit 13 detects a vector pair as a combination of face feature representative vectors having the shortest distance among combinations of a face feature representative vector generated from Moving image A and a face feature representative vector generated from Moving image C. The two face feature representative vectors of the vector pair detected in this manner can be estimated as face feature representative vectors of Person b, who is a common character of Moving image A and Moving image C. Thus, the label assigning unit 14 assigns the label of Person b to the two face feature representative vectors of the vector pair. For Moving image A, since the labels of Person a and Person b are assigned to two of the three face feature representative vectors, the remaining face feature representative vector can be estimated to be of Person c. Thus, the label assigning unit 14 assigns the label of Person c to the remaining face feature representative vector.

Subsequently, as illustrated in FIG. 6, the feature amount pair detection unit 13 selects a moving image pair of Moving image B and Moving image C and maps, in a common feature vector space, the three face feature representative vectors generated from Moving image B and the three face feature representative vectors generated from Moving image C. Then, the feature amount pair detection unit 13 detects a vector pair as a combination of face feature representative vectors having the shortest distance among combinations of a face feature representative vector generated from Moving image B and a face feature representative vector generated from Moving image C. The two face feature representative vectors of the vector pair detected in this manner can be estimated as face feature representative vectors of Person d, who is a common character of Moving image B and Moving image C. Thus, the label assigning unit 14 assigns the label of Person d to the two face feature representative vectors of the vector pair. For Moving image B, since the labels of Person a and Person d are assigned to two of the three face feature representative vectors, the remaining face feature representative vector can be estimated to be of Person e. Thus, the label assigning unit 14 assigns the label of Person e to the remaining face feature representative vector. For Moving image C, since the labels of Person b and Person d are assigned to two of the three face feature representative vectors, the remaining face feature representative vector can be estimated to be of Person f. Thus, the label assigning unit 14 assigns the label of Person f to the remaining face feature representative vector.

When the correspondence relation between a face feature representative vector and a main character is narrowed down by using a moving image pair having one common character as described above, the label of each main character name can be automatically assigned to a face feature representative vector generated from each moving image. Once a label is assigned to a face feature representative vector, for example, scene search metadata of the moving image can be generated by using the face feature representative vector to which the label is assigned.

Figure 7:
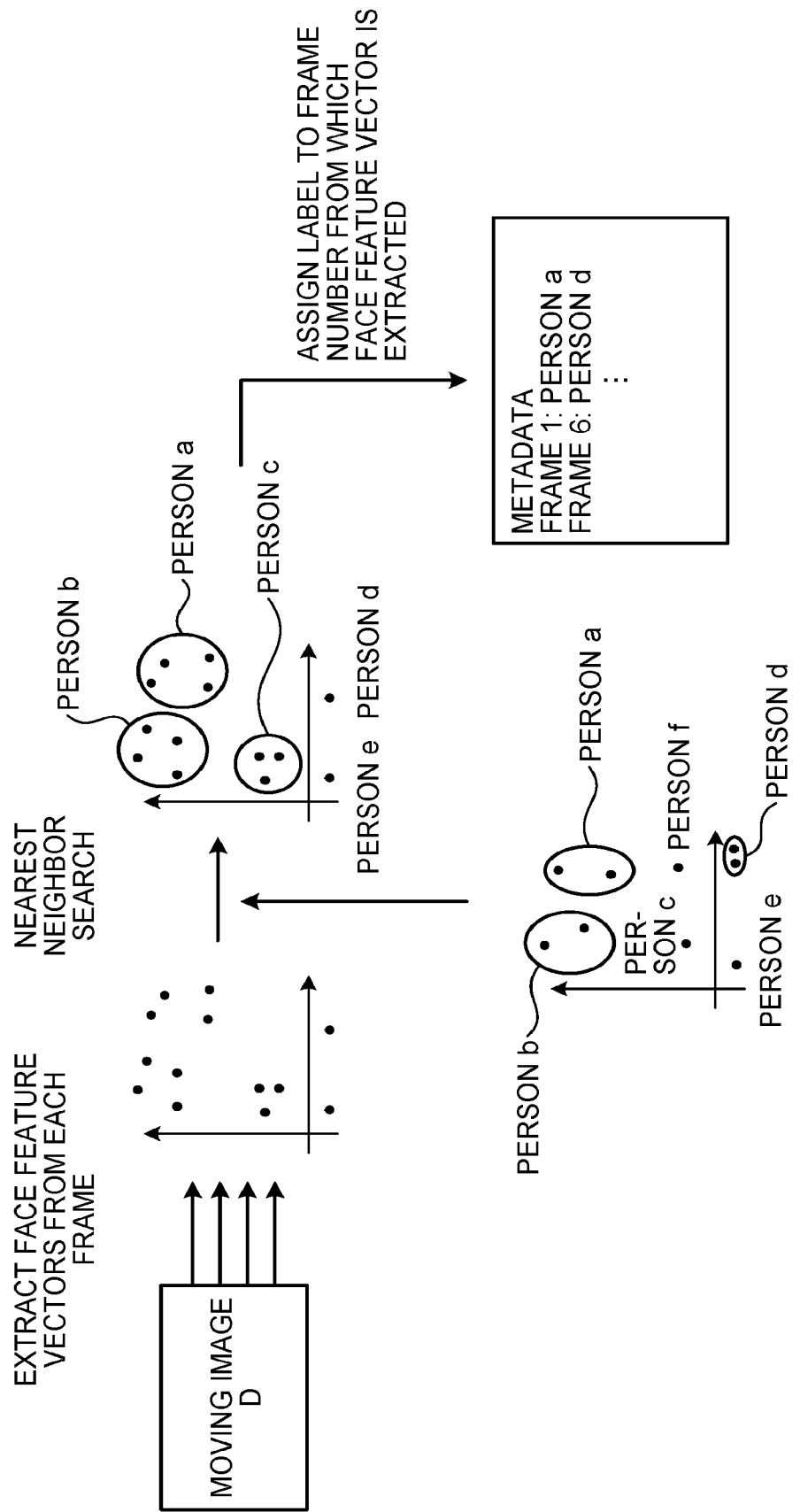
FIG. 7 is a diagram for explaining processing of generating metadata of a moving image.

The following describes, with reference to FIG. 7, a specific example of processing of generating metadata of a moving image by using a face feature representative vector to which a label is assigned. FIG. 7 is a diagram for explaining the processing of generating metadata of a moving image.

The metadata generation unit 15 takes out, from the content DB 50, Moving image D for which metadata is to be generated, passes Moving image D to the feature amount extraction unit 12, and requests generation of face feature vectors. Moving image D may be a content 51 not associated with association data 52. Alternatively, Moving image D may be a moving image (such as the above-described Moving image A, B, or C) for which label assigning to a face feature representative vector is performed through the above-described processing. As illustrated in FIG. 7, similarly to the above-described processing on Moving image A, the feature amount extraction unit 12 performs face feature vector generation processing on Moving image D passed from the metadata generation unit 15. Specifically, character face detection is performed for each frame of Moving image D to generate a face feature vector. In this case, the metadata generation unit 15 records each face feature vector extracted by the feature amount extraction unit 12 in the data holding unit 16 in association with the frame number of a scene from which the face feature vector is extracted.

Subsequently, the metadata generation unit 15 passes all face feature vectors generated from Moving image D to the label assigning unit 14 and requests label assigning by nearest neighbor search using any face feature representative vector to which a label is assigned. In accordance with the request from the metadata generation unit 15, the label assigning unit 14 performs nearest neighbor search on face feature representative vector groups to which labels are assigned by using, as a query vector, each face feature vector generated from Moving image D. The nearest neighbor search is processing of searching the nearest vector to a query vector from among vector groups. This nearest neighbor search specifies a nearest face feature representative vector for each face feature vector generated from Moving image D.

Subsequently, the label assigning unit 14 calculates the distance between each face feature vector generated from Moving image D and the specified nearest face feature representative vector. Then, when the calculated distance is equal to or smaller than the above-described threshold value, in other words, is equal to or smaller than the in-cluster maximum distance of the face feature representative vector, a label same as that of the face feature representative vector is assigned to the face feature vector. This prevents assigning of a wrong label to the face feature vector generated from Moving image D.

Once a label is assigned to each face feature vector generated from Moving image D as described above, the metadata generation unit 15 refers to the correspondence relation between a face feature vector and the number of a frame, which is recorded in the data holding unit 16, and assigns, to the number of a frame from which a face feature vector is extracted, a label assigned to the face feature vector. This label assigned to the number of a frame serves as metadata for searching a TV program for a scene in which a desired main character appears.

As described above, with the label assigning device 10 according to the present embodiment, plural data sets 53 each including a content 51 and association data 52 are used in combinations to perform processing of narrowing down the correspondence relation between a feature amount and a label candidate, thereby automatically assigning a label to a feature amount extracted from the content 51. In addition, with the label assigning device 10 according to the present embodiment, a label can be automatically assigned to a feature amount extracted from another content 51 by performing simple nearest neighbor search using any feature amount to which a label is assigned, and for example, scene search metadata of the content 51 can be automatically generated.

Although the above description assumes that plural data sets 53 are present, the single content 51 may be divided and used to achieve automatic label assigning to a feature amount through processing similar to the above-described processing. For example, one moving image is divided into a plurality of images, and each divided moving images is considered as the individual content 51. In this case, each divided moving image needs to be associated with association data 52, but text data such as subtitle information assigned to the moving image or a result of voice recognition of voice linked with the moving image can be employed as association data 52 so that each divided moving image is associated with the association data 52. This is because text data such as subtitle information or a voice recognition result is associated with each scene of the moving image (has time information) and this information is automatically divided when the moving image is divided.

Although the above description assumes that the moving image of a TV program is the content 51, automatic assigning of a label to a feature amount and automatic generation of metadata can be performed in a similar manner when the content 51 as a processing target is a moving image of any other kind. Exemplary applications other than a TV program include moving image distribution service. In addition, for example, when an entry/exit record to/from a factory is used as the association data 52, the name or employee number of a worker and the like can be automatically assigned as a label to a feature amount of a worker extracted from a video obtained by capturing the inside of the factory with a camera installed in the factory. In a case of a home robot having a plurality of modalities such as a microphone and a camera, for example, text data of a result of voice recognition of voice acquired by the microphone and a video captured by the camera can be combined to perform automatic assigning (so called concept learning) of, as a label, a label candidate generated from the text data of the voice recognition result to a feature amount of a person extracted from the video.

Although the above description is made on an example in which a moving image is the content 51, it is possible to achieve automatic label assigning to a feature amount extracted from the content 51 by processing same as that in the above-described example when the content 51 is a stationary image, voice, or sensor data. Examples thereof are described below.

In a case of a stationary image, for example, a picture in which a plurality of persons appear is the content 51, and the title of the picture is the association data 52. In this case, a plurality of face feature vectors can be obtained by performing face detection and face feature vector generation for the picture. In addition, a plurality of label candidates can be obtained from the title of the picture. Similarly to the above-described example, it is possible to achieve automatic label assigning to each face feature vector by using these face feature vectors and label candidates.

In a case of voice, for example, voice of a radio drama is a content 51, and description of the drama is association data 52. In this case, a feature vector that specifies a speaker is generated from the waveform of voice data, and a label candidate such as the name of a speaker is generated from the description of the drama. Similarly to the above-described example, it is possible to achieve automatic label assigning to a feature vector that specifies a speaker by using these feature vector and label candidate.

In a case of sensor data, for example, temporally sequential data of a motor rotation speed output from a rotation sensor attached to a motor as a monitoring target is a content 51. It is assumed that there is a document that records observation of the state of the motor by a user, and the document is association data 52. In this case, keywords such as excessive rotation, insufficient rotation, and normal rotation are taken out from the document and set as label candidates. In addition, the motor rotation speed is extracted as a feature amount from the temporally sequential data of the motor rotation speed output from the rotation sensor, and K-means clustering of the extracted motor rotation speed is performed by using the number of keywords to obtain the representative feature amount of excessive rotation, the representative feature amount of insufficient rotation, and the representative feature amount of normal rotation. Similarly to the above-described example, it is possible to automatically assign a label such as excessive rotation, insufficient rotation, or normal rotation to the motor rotation speed by using these representative feature amounts.

Second Embodiment

The following describes a second embodiment. The present embodiment is the above-described first embodiment having an additional function to absorb an orthographical variant of a label candidate. The other functions are same as those of the above-described first embodiment, and thus only any function unique to the present embodiment will be described below.

The above-described first embodiment assumes that a single label candidate is generated for a main character appearing in a TV program. However, in reality, a single person sometimes appears in different notations such as a real name and a stage name in program description. In such a case, a label candidate generated from the program description has an orthographical variant, and the orthographical variant needs to be absorbed. Thus, in the present embodiment, a meaning vector is generated from words of a label candidate, and label candidates having meaning vectors similar to each other are commonalized to countermeasure an expressional/orthographical variant.

Figure 8:
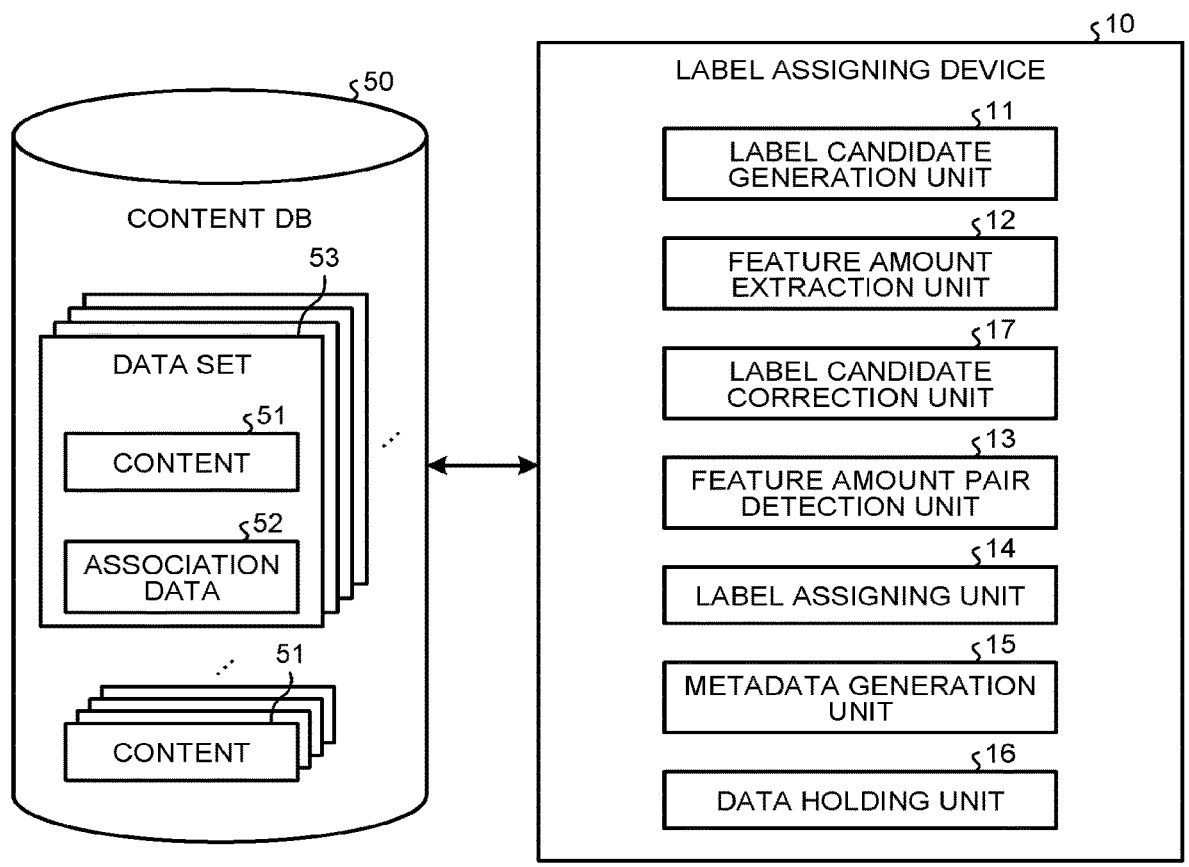
FIG. 8 is a block diagram illustrating an exemplary functional configuration of the label assigning device according to a second embodiment.

FIG. 8 is a block diagram illustrating an exemplary functional configuration the label assigning device 10 according to the second embodiment. The label assigning device 10 according to the present embodiment includes a label candidate correction unit 17 in addition to the configuration of the first embodiment illustrated in FIG. 2.

The label candidate correction unit 17 generates the meaning vector of each label candidate generated from association data 52 by the label candidate generation unit 11, and commonalizes label candidates having a similarity equal to or larger than a threshold value between the meaning vectors. A meaning vector expresses a meaning of words, and for example, in a known method, the meaning is expressed by using co-occurring information of the words.

The label candidate correction unit 17 first performs learning of a model for generating the meaning vector of a label candidate. Specifically, the label candidate correction unit 17 first collects all association data 52 (text data) stored in the content DB 50 and performs word division processing on the collected text data by morpheme analysis using Mecab described above or the like. Then, the label candidate correction unit 17 learns a model for generating a meaning vector by using a group of words obtained through the word division. This learning may be performed by using, for example, conventional Word2Vec. Alternatively, for example, conventional GloVe may be used.

Thereafter, when the name of each main character is generated as a label candidate from the association data 52 by the label candidate generation unit 11, the label candidate correction unit 17 generates a meaning vector from the main character by using the learned model. Then, the label candidate correction unit 17 calculates the similarity between meaning vectors of each combination. In this case, the meaning vectors of a combination, which have a similarity equal to or larger than the threshold value are considered to have similar meanings. Thus, each combination of such meaning vectors is extracted. The threshold value is a super parameter. A combination of meaning vectors is not limited to a combination of two meaning vectors but may be a combination of three or more meaning vectors.

The label candidate correction unit 17 performs processing of commonalizing label candidates on the combination of meaning vectors extracted as described above. The commonalization of label candidates is change of notations of the label candidates to an identical notation. For example, the number of contained words of each label candidate can be calculated based on a result of the above-described word division processing. The label candidate correction unit 17 commonalizes the label candidates having a similarity equal to or larger than the threshold value between the meaning vectors by using the notation of a label candidate, the number of contained words of which is largest.

As described above, according to the present embodiment, an orthographical variant of a label candidate can be absorbed by the label candidate correction unit 17. Thus, when a label candidate generated from the association data 52 has an orthographical variant, for example, when a person appears in different notations in program description, the orthographical variant can be absorbed before processing same as that of the above-described first embodiment. Accordingly, such a problem is resolvable in that different labels are assigned to the same person.

Third Embodiment

The following describes a third embodiment. The present embodiment is the above-described first embodiment having an additional function for efficiently performing manual label assigning to a feature amount to which a label cannot be automatically assigned. The other functions are same as those of the above-described first embodiment, and thus only any function unique to the present embodiment will be described below.

The above-described first embodiment uses a moving image pair having one common character to automatically assign, as a label, the name of a common character to each face feature representative vector estimated to represent the common character. However, it is assumed that moving images in the content DB 50 sometimes include a moving image that cannot have one common character in all combinations with the other moving images. In such a case, label assigning needs to be manually performed by a user. However, it is cumbersome to manually assign labels to all patterns to which labels cannot be automatically assigned. Thus, in the present embodiment, such a label candidate that, when a label is manually assigned to one face feature representative vector, another label can be automatically assigned to another face feature representative vector is selected as a teaching target and presented to the user. Specifically, plural combinations of moving images having plural common characters are used to check duplication of each common character among the combinations of moving images, thereby specifying a person with which the label of any other person is automatically determined by elimination when teaching is performed. Then, the user is prompted to preferentially perform a teaching operation for the person, thereby achieving label assigning with less labor.

Figure 9:
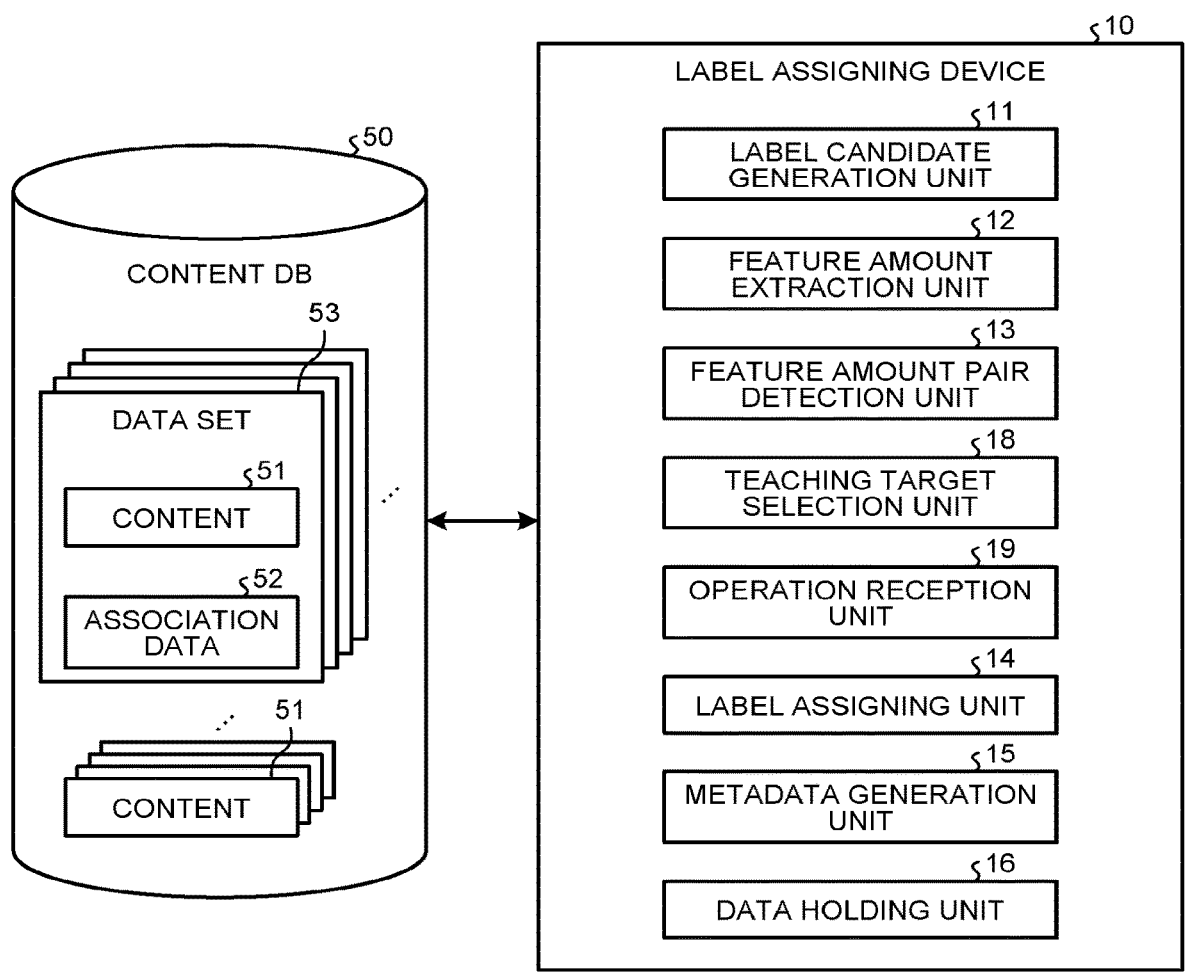
FIG. 9 is a block diagram illustrating an exemplary functional configuration of the label assigning device according to a third embodiment.

FIG. 9 is a block diagram illustrating an exemplary functional configuration of the label assigning device 10 according to the third embodiment. The label assigning device 10 according to the present embodiment includes a teaching target selection unit 18 and an operation reception unit 19 in addition to the configuration of the first embodiment illustrated in FIG. 2.

When a plurality of common label candidates is present and determination of the relation between one label candidate and a feature amount determines the relation between another label candidate and a feature amount, the teaching target selection unit 18 selects this one label candidate as a teaching target. For example, the teaching target selection unit 18 uses a plurality of combinations of moving images having a plurality of common characters and checks duplication of each common character among the combinations of moving images to specify a person as a teaching target.

The operation reception unit 19 receives a user operation to teach the relation between the teaching target label candidate selected by the teaching target selection unit 18 and a feature amount. For example, the operation reception unit 19 presents a person name as the teaching target label candidate to the user together with face moving images when face feature representative vectors are generated from each moving image of a combination, and receives a user operation to select a face image that matches the person name as the teaching target label candidate.

Figure 10:
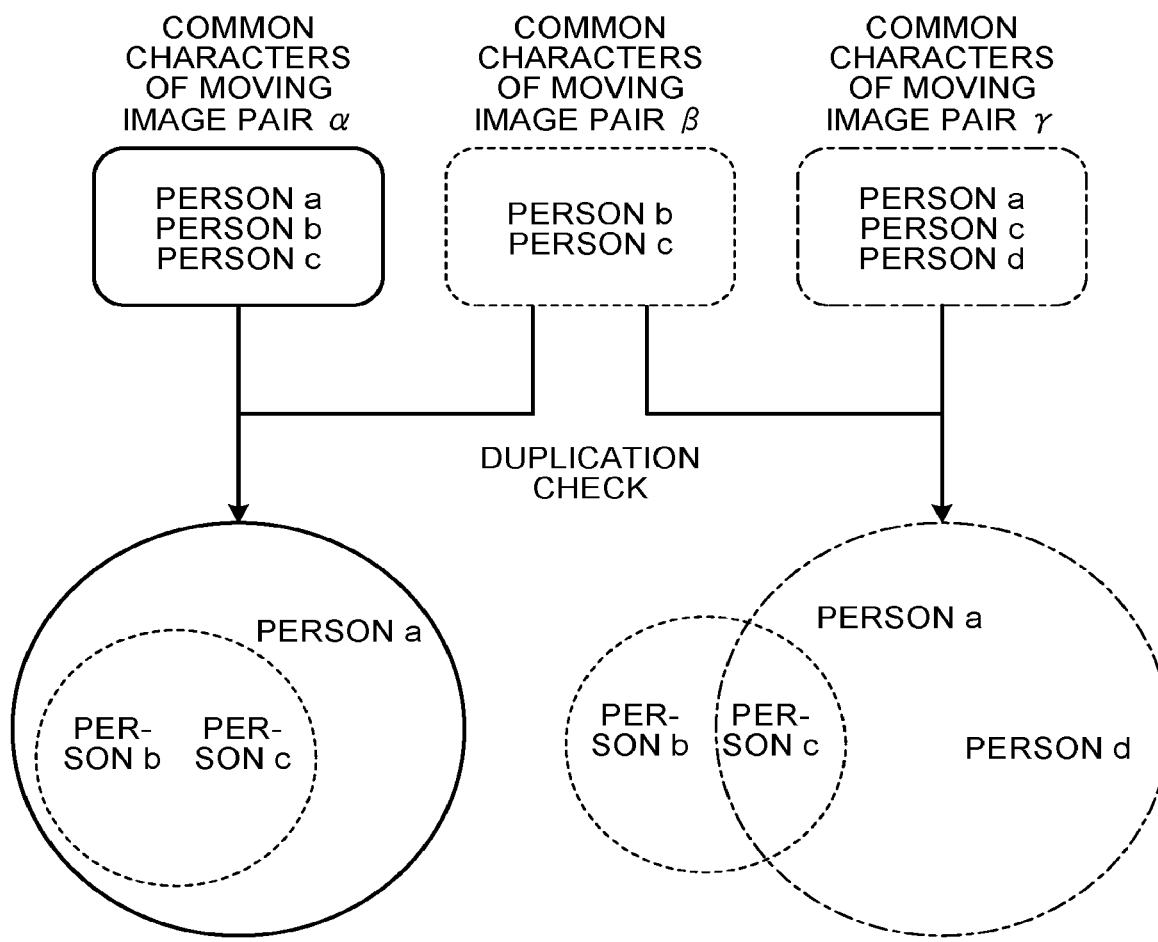
FIG. 10 is a diagram for explaining an outline of processing of the third embodiment.
Figure 11:
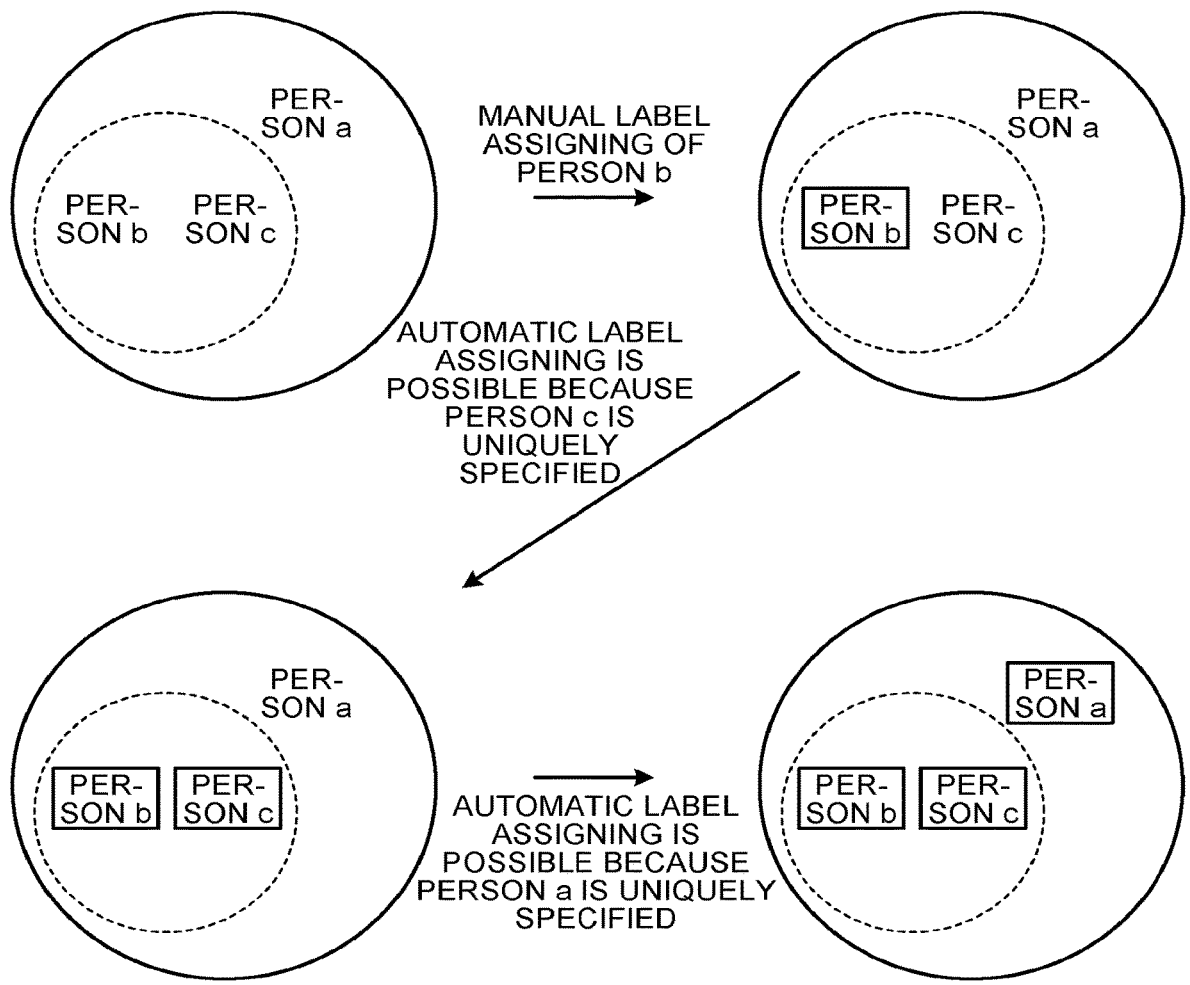
FIG. 11 is a diagram for explaining an outline of the processing of the third embodiment.

The following describes a specific example of processing of the present embodiment with reference to FIGS. 10 to 12. FIGS. 10 to 12 are diagrams for explaining an outline of the processing of the present embodiment. The following description is made on an example in which three moving image pairs α, β, and γ as illustrated in FIG. 10 are used. Moving image pair α has three common characters of Person a, Person b, and Person c, Moving image pair β has two common characters of Person b and Person c, and Moving image pair γ has three common characters of Person a, Person c, and Person d.

The teaching target selection unit 18 first classifies the established moving image pairs based on the number of common characters. In the above-described embodiment, the moving image pairs are classified into Moving image pair β having two common characters and Moving image pairs α and γ each having three common characters.

Subsequently, the teaching target selection unit 18 checks common character duplication in each combination of a moving image pair having a smaller number of common characters and a moving image pair having a larger number of common characters. Then, a combination of moving image pairs having a smaller number of common characters not duplicating, in other words, a combination of moving image pairs having a smaller result of negative AND (NOT AND) of common characters is selected. In the above-described embodiment, as illustrated in FIG. 10, the combination of Moving image pair α and Moving image pair β is selected since the number of common characters not duplicating is one (Person a) in the combination of Moving image pair α and Moving image pair β and three (Person a, Person b, and Person d) in the combination of Moving image pair α and Moving image pair γ.

Subsequently, the teaching target selection unit 18 selects a moving image pair having a smallest number of common characters in the selected combination of moving image pairs. In the above-described embodiment, Moving image pair β is selected since Moving image pair α has three common characters of Person a, Person b, and Person c and Moving image pair β has two common characters of Person b and Person c in the combination of Moving image pair α and Moving image pair β.

Subsequently, the teaching target selection unit 18 randomly selects one of label candidates in a number equal to the number of common characters of the selected moving image pair. The label candidate is the name of a main character selected as a teaching target from a main character list. Then, the operation reception unit 19 presents the label candidate selected by the teaching target selection unit 18 to the user together with a list of face images corresponding to respective face feature representative vectors in a number equal to the number of main characters. In the above-described embodiment, the name of Person b or Person c as a common character of Moving image pair β is presented to the user together with the face image list.

When the label candidate and the face image list are presented by the operation reception unit 19, the user selects a face image that matches the label candidate from the face image list. This operation is an operation to teach the relation between the presented label candidate and the face feature representative vector of a common character. When this teaching operation is received by the operation reception unit 19, the label assigning unit 14 assigns, as a label, the person name of the label candidate to the face feature representative vector.

When the moving image pair has two common characters, determination of the correspondence relation between a label candidate and a face feature representative vector for one of the common characters determines the correspondence relation between a label candidate and a face feature representative vector for the other common character. Accordingly, a label can be automatically assigned to a face feature representative vector to which a label is yet to be assigned. When the moving image pair has three or more common characters, the correspondence relation between a label candidate and a face feature representative vector can be confirmed for all common characters of the moving image pair and a label can be assigned to each face feature representative vector by repeating the processing of selecting a teaching target label candidate, presenting a selected label candidate together with a face image list, and receiving a teaching operation by the user. In addition, the processing of the above-described first embodiment can be assigned when the number of common characters to which a label is yet to be assigned becomes one, thereby automatically assigning a label to a face feature representative vector to which a label is yet to be assigned.

Through the above-described procedure, common-character label assigning is completed for one moving image pair in a selected combination of moving image pairs. In the above-described embodiment, label assigning is completed for Person b and Person c as the common characters of Moving image pair β in the combination of Moving image pair α and Moving image pair β. Specifically, as illustrated in FIG. 11, when label assigning is manually performed for Person b as one of the common characters of Moving image pair β, label assigning is automatically performed for Person c as the other common character.

Subsequently, the other moving image pair in the selected combination of moving image pairs is considered. First, among the common characters of the other moving image pair, any common character duplicating in the one moving image pair for which label assigning is already completed is deleted. In the above-described embodiment, among Person a, Person b, and Person c as the common characters of Moving image pair α, Person b and Person c for which label assigning is completed are deleted. When one common character remains through the deletion, the correspondence relation between a label candidate and a face feature representative vector is determined, and thus label assigning can be automatically performed. In the above-described embodiment, since Person a is only one common character remaining through the deletion among the common characters of Moving image pair α, label assigning is automatically performed for Person a as a common character of Moving image pair α as illustrated in FIG. 11. When two or more common characters remain through the deletion among the common characters of Moving image pair α, label assigning can be performed for a common character to which a label is yet to be assigned by performing, similarly to the above-described processing on Moving image pair β, the processing of selecting a teaching target label candidate, presenting a selected label candidate together with a face image list, and receiving a teaching operation by the user.

Similarly, any common character for which label assigning is already completed is deleted for an unprocessed moving image pair not included in the selected combination of moving image pairs. In the above-described embodiment, among Person a, Person c, and Person d as the common characters of Moving image pair γ, Person a and Person c for which label assigning is completed are deleted. When one common character remains through the deletion, the correspondence relation between a label candidate and a face feature representative vector is determined, and thus label assigning can be automatically performed. In the above-described embodiment, since Person d is only one common character remaining through the deletion among the common characters of Moving image pair γ, label assigning is automatically performed for Person d as a common character of Moving image pair γ as illustrated in FIG. 12. When two or more common characters remain through the deletion among the common characters of Moving image pair γ, label assigning can be performed for a common character to which a label is yet to be assigned by performing, similarly to the above-described processing on Moving image pair β, the processing of selecting a teaching target label candidate, presenting a selected label candidate together with a face image list, and receiving a teaching operation by the user.

As described above, according to the present embodiment, when label assigning needs to be manually performed by the user, a label candidate that allows efficient label assigning by elimination is selected as a teaching target and a teaching operation for the label candidate is preferentially performed to reduce labor of the user for manual label assigning, thereby efficiently performing label assigning.

Fourth Embodiment

The following describes a fourth embodiment. The present embodiment is the above-described first embodiment having an additional function for checking whether automatic assigning of a label to a feature amount is processed as expected and performing manual check and correction by the user when the automatic assigning is potentially not processed as expected. The other functions are same as those of the above-described first embodiment, and thus only any function unique to the present embodiment will be described below.

In the above-described first embodiment, processing is performed based on an assumption that a main character frequently appears in a moving image and a non-main character hardly appears in the moving image. Thus, expected processing is potentially not performed in a case in which the assumption does not hold. Specifically, this is a case in which no face feature representative vector of a main character is generated but a face feature representative vector of a non-main character is generated. Thus, in the present embodiment, an error score is calculated for an above-described vector pair, and whether face feature representative vectors of the vector pair belong to an identical person is checked based on the error score. When the face feature representative vectors do not belong to an identical person as a result of the check, it is highly likely that a face feature representative vector of a non-main character is generated. Thus, manual check and correction by the user are performed. Accordingly, when a wrong label is assigned to a face feature representative vector due to generation of a face feature representative vector of a non-main character, this error can be corrected.

Figure 13:
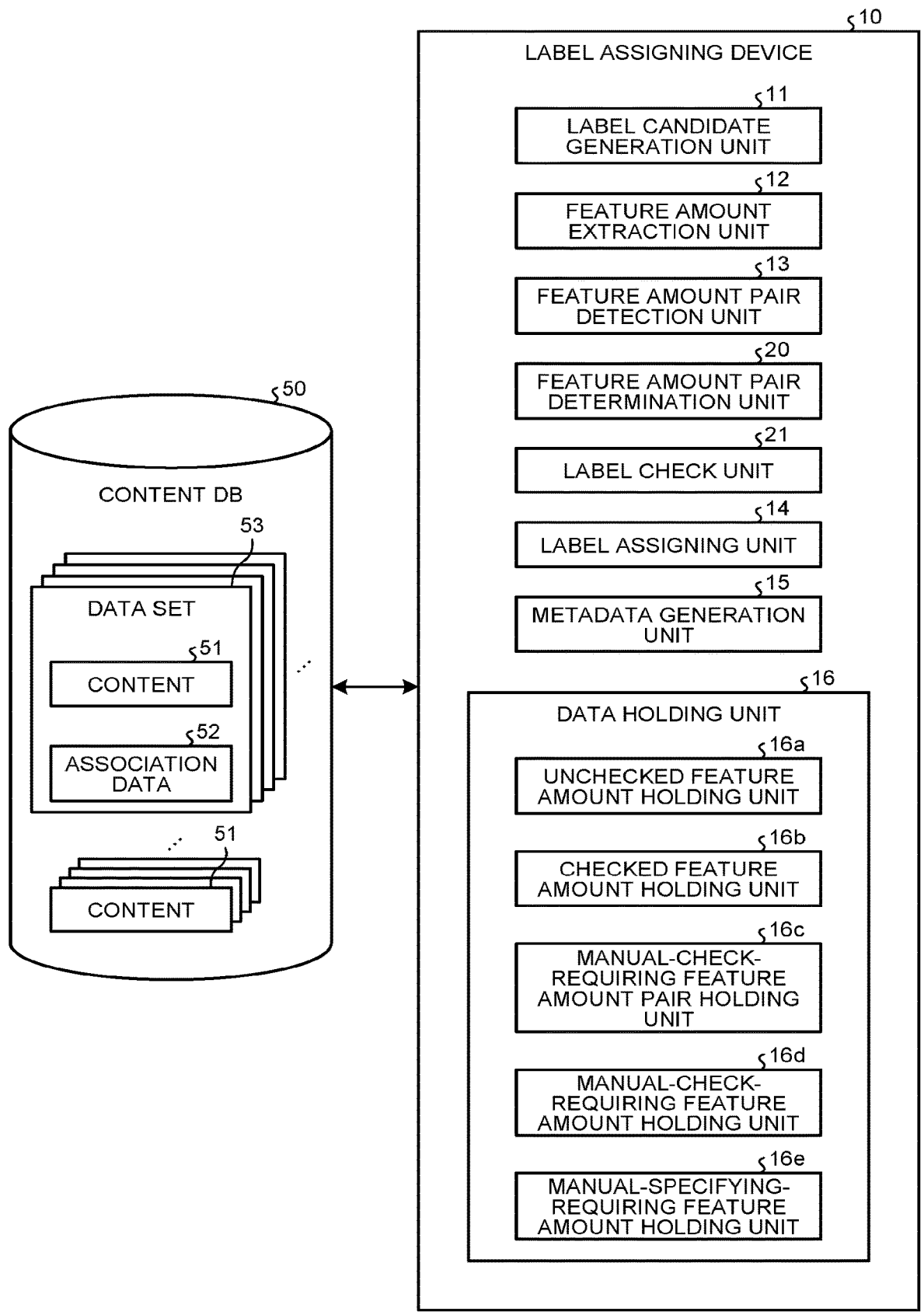
FIG. 13 is a block diagram illustrating an exemplary functional configuration of the label assigning device according to a fourth embodiment.

FIG. 13 is a block diagram illustrating an exemplary functional configuration of a label assigning device according to the fourth embodiment. This label assigning device 10 according to the present embodiment includes a feature amount pair determination unit 20 and a label check unit 21 in addition to the configuration of the first embodiment illustrated in FIG. 2. In addition, in the present embodiment, the data holding unit 16 includes an unchecked feature amount holding unit 16a, a checked feature amount holding unit 16b, a manual-check-requiring feature amount pair holding unit 16c, a manual-check-requiring feature amount holding unit 16d, and a manual-specifying-requiring feature amount holding unit 16e.

The unchecked feature amount holding unit 16a holds a face feature representative vector for which it is not checked that label assigning is correctly performed and related information (any one of label, face image, and vector pair configuration information) thereof. The vector pair configuration information is information indicating, together with the face feature representative vector, another face feature representative vector of the vector pair.

The checked feature amount holding unit 16b holds a face feature representative vector for which it is checked that label assigning is correctly performed and related information (label and face image) thereof.

The manual-check-requiring feature amount pair holding unit 16c holds face feature representative vectors of a vector pair that needs manual check by the user, and related information (label, face image, and vector pair configuration information) thereof.

The manual-check-requiring feature amount holding unit 16d holds a face feature representative vector that needs manual check by the user, and related information (label and face image) thereof.

The manual-specifying-requiring feature amount holding unit 16e holds a face feature representative vector for which a label needs to be manually specified by the user and related information (label and face image) thereof.

The feature amount pair determination unit 20 calculates the error score of a vector pair for, among face feature representative vectors taken out of the unchecked feature amount holding unit 16a, a face feature representative vector that is capable of constituting a vector pair with another face feature representative vector, in other words, a face feature representative vector having vector pair configuration information. Then, the feature amount pair determination unit 20 determines whether the vector pair belongs to an identical person based on the calculated error score. For example, when the error score of the vector pair is equal to or lower than a given threshold value, it is determined that the vector pair belongs to an identical person. When the error score of the vector pair exceeds the threshold value, it is determined the vector pair does not belong to an identical person. The error score of the vector pair is low when the two face feature representative vectors of the vector pair belong to an identical person or is high when the two face feature representative vectors belong to different persons. The error score may be, for example, the distance (Euclidean distance) between the two face feature representative vectors or a value obtained by subtracting, from one, the value of the inner product of the two face feature representative vectors.

When the vector pair belongs to an identical person, it is extremely highly likely that a face feature representative vector is appropriately generated, in other words, is the face feature representative vector of a main character. This is because, when a combination of moving images is selected so that a main character duplicates in the moving images, it is considered to be extremely highly unlikely that a non-main character more frequently appears in each moving image than a main character and the same non-main character duplicates in a plurality of moving images.

The label check unit 21 checks, with the user, whether a correct label is assigned to each face feature representative vector of a vector pair, having the error score exceeding the threshold value, or a face feature representative vector not constituting (that is incapable of constituting) a vector pair. For example, the label check unit 21 presents, to the user, a face image and a label (person name) related to a face feature representative vector as a check target, and acquires a result of checking whether the face image and the label match each other.

Figure 14:
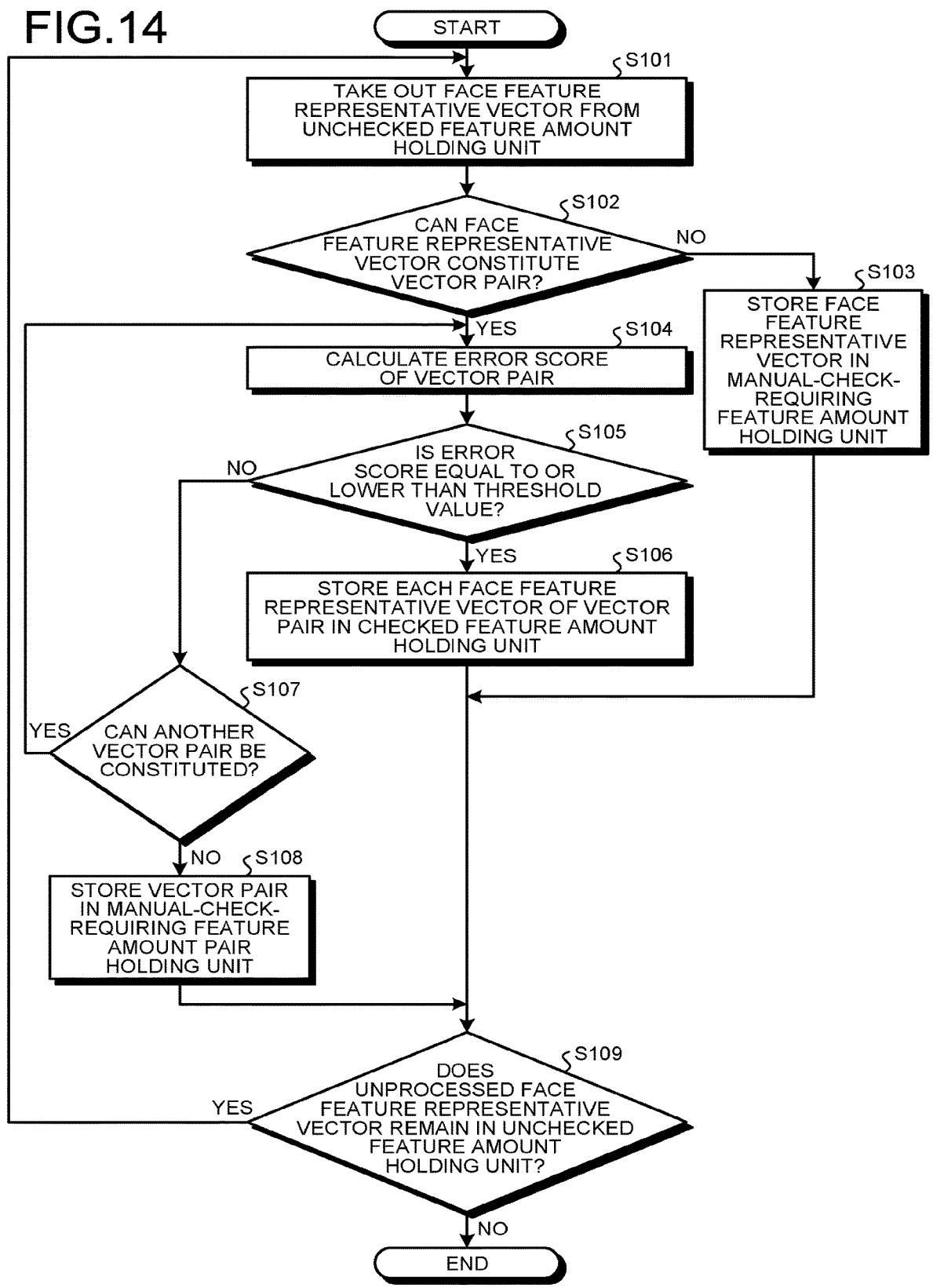
FIG. 14 is a flowchart illustrating an exemplary procedure of processing of the fourth embodiment.
Figure 15:
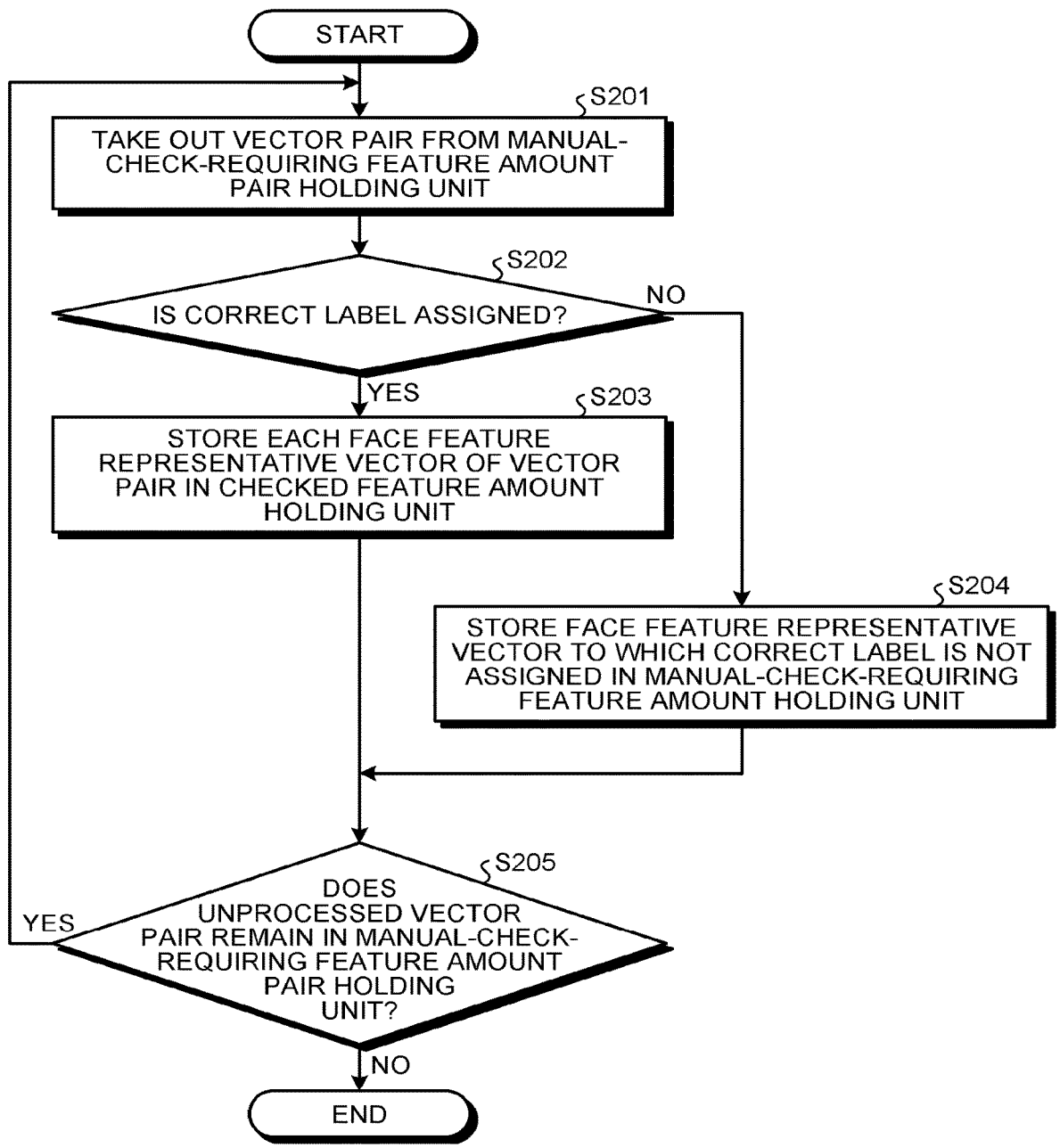
FIG. 15 is a flowchart illustrating an exemplary procedure of the processing of the fourth embodiment.
Figure 16:
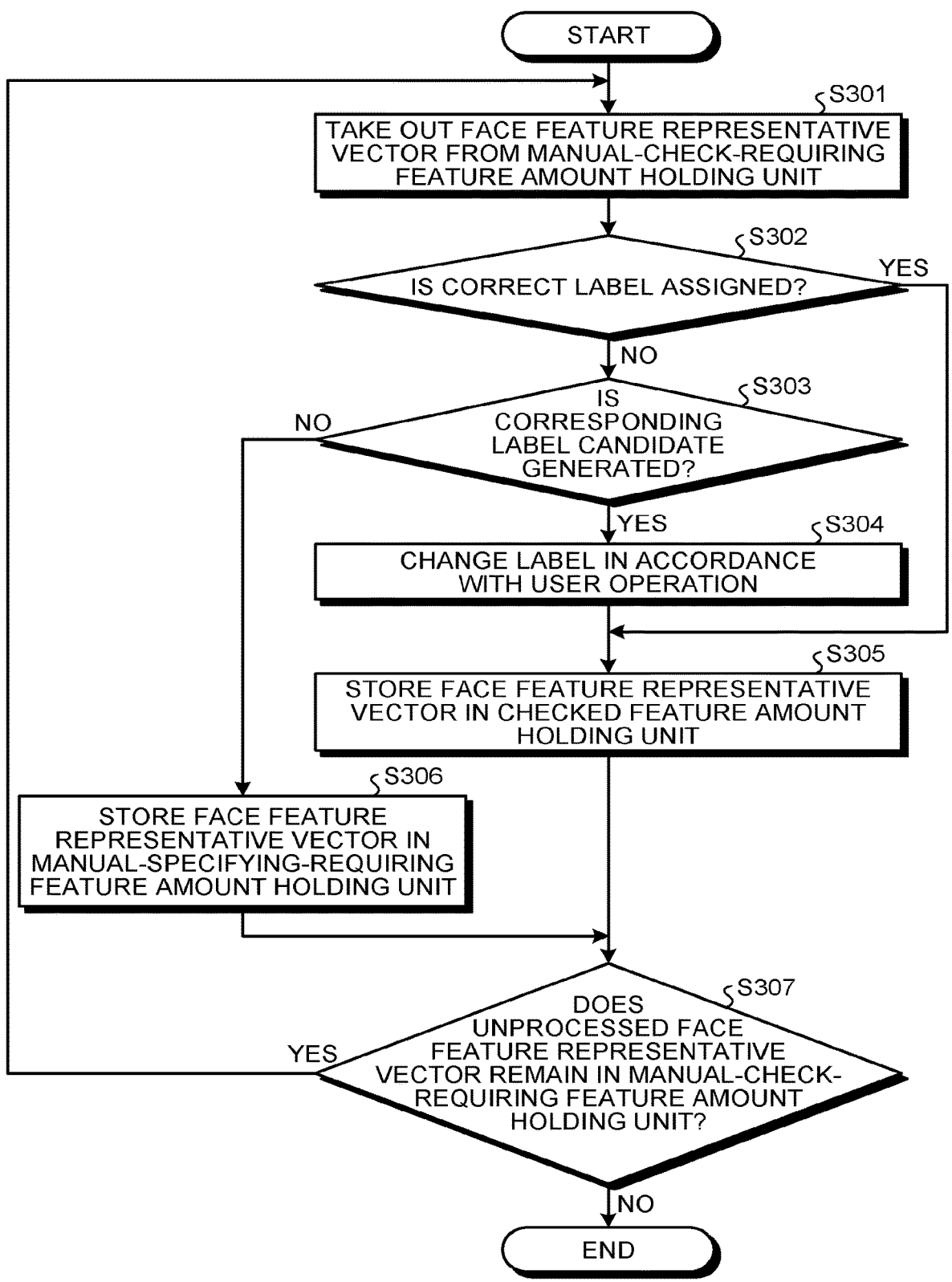
FIG. 16 is a flowchart illustrating an exemplary procedure of the processing of the fourth embodiment.
Figure 17:
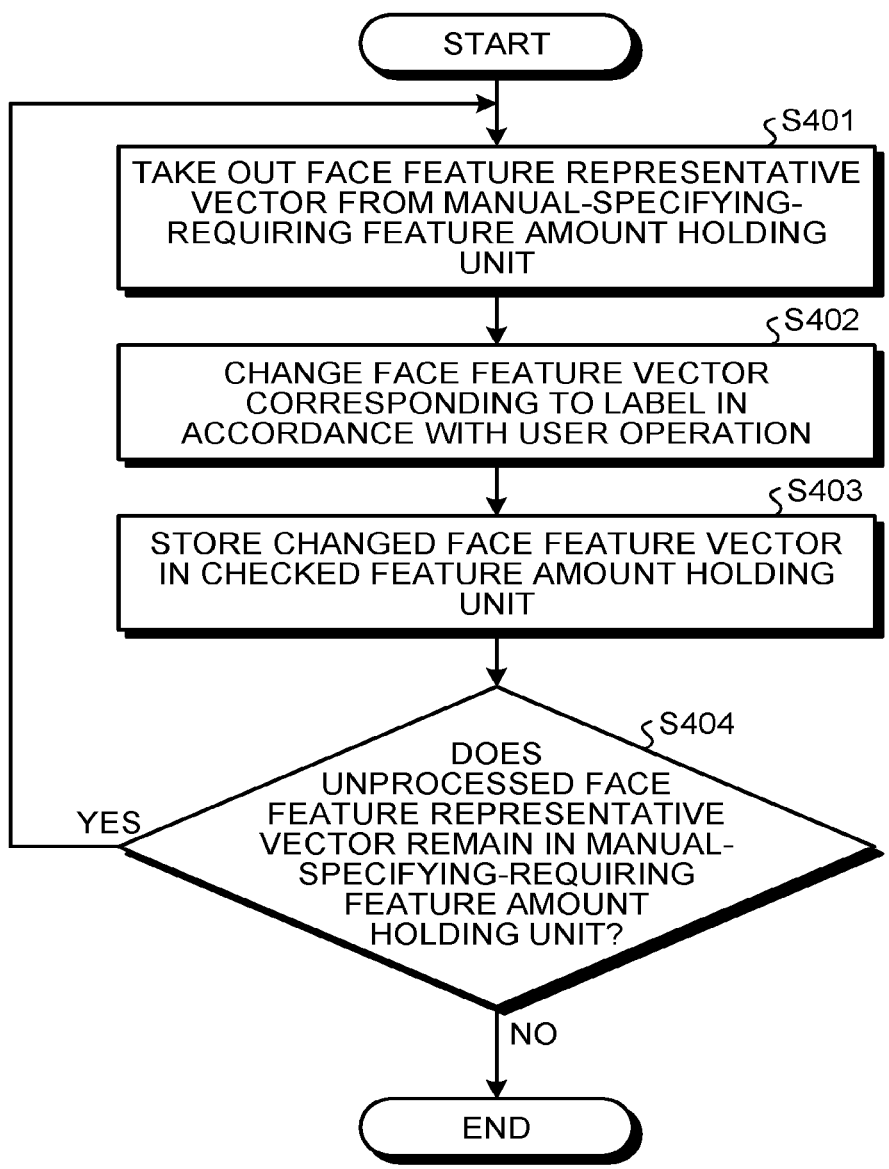
FIG. 17 is a flowchart illustrating an exemplary procedure of the processing of the fourth embodiment.

The following describes the process of processing of the present embodiment with reference to FIGS. 14 to 17. FIGS. 14 to 17 are flowcharts illustrating an exemplary procedure of the processing of the present embodiment. The processing of the present embodiment includes the following two pieces of processing of Processing (1) and Processing (2). FIG. 14 illustrates the procedure of Processing (1), and FIGS. 15 to 17 illustrate the procedure of Processing (2).

Processing (1): whether face feature representative vectors are appropriately generated at high probability is automatically checked, and any face feature representative vector that needs manual check by the user is stored in the manual-check-requiring feature amount pair holding unit 16c or the manual-check-requiring feature amount holding unit 16d.

Processing (2): whether labels are appropriately assigned to face feature representative vectors stored in the manual-check-requiring feature amount pair holding unit 16c and the manual-check-requiring feature amount holding unit 16d is checked through manual check by the user, and manual correction by the user is received when needed.

First, Processing (1) will be described with reference to the flowchart in FIG. 14. When Processing (1) is started, the feature amount pair determination unit 20 takes one face feature representative vector out of the unchecked feature amount holding unit 16a (step S101). Then, the feature amount pair determination unit 20 determines whether the face feature representative vector taken out at step S101 is a face feature representative vector that is capable of constituting a vector pair (step S102). Whether the face feature representative vector is capable of constituting a vector pair can be determined based on, for example, whether the face feature representative vector has vector pair configuration information.

If it is determined that the face feature representative vector taken out at step S101 is incapable of constituting a vector pair (No at step S102), the feature amount pair determination unit 20 stores the face feature representative vector in the manual-check-requiring feature amount holding unit 16d (step S103). On the other hand, if it is determined that the face feature representative vector taken out at step S101 is capable of constituting a vector pair (Yes at step S102), the feature amount pair determination unit 20 calculates the error score of the vector pair constituted by the face feature representative vector (step S104) and determines whether the calculated error score is equal to or lower than a threshold value (step S105).

The threshold value used for the determination at step S105 is set to be, for example, twice of an average error score over all vector pairs. This is because, when there is a sufficient amount of image data, it is considered that most of the vector pairs belong to an identical person and a correctly associated vector pair has an error score close to the average value. The threshold value is twice of the average value for purpose of description in this embodiment but may be determined by tuning. For example, a median may be used in place of the average value.

If the error score of the vector pair is equal to or lower than the threshold value (Yes at step S105), it is considered that the vector pair is constituted of face feature representative vectors of an identical person. In this case, since it is considered that a correct label is assigned to each face feature representative vector of the vector pair, the feature amount pair determination unit 20 stores each face feature representative vector of the vector pair in the checked feature amount holding unit 16b (step S106).

On the other hand, if the error score of the vector pair exceeds the threshold value (No at step S105), the feature amount pair determination unit 20 determines whether the face feature representative vector taken out at step S101 is capable of constituting another vector pair (step S107). If the face feature representative vector is capable of constituting another vector pair (Yes at step S107), the feature amount pair determination unit 20 returns to step S104 to repeat the error score calculation and the threshold value determination for this vector pair. In other words, when the face feature representative vector taken out at step S101 is capable of constituting another vector pair by changing a combination of moving images, it is checked whether the error score of this vector pair is equal to or lower than the threshold value. Then, if no vector pair, the error score of which is equal to or lower than the threshold value, is found for all combinations of moving images (No at step S107), a vector pair having the smallest error score is stored in the manual-check-requiring feature amount pair holding unit 16c (step S108).

Thereafter, the feature amount pair determination unit 20 determines whether any unprocessed face feature representative vector remains in the unchecked feature amount holding unit 16a (step S109). If any unprocessed face feature representative vector remains in the unchecked feature amount holding unit 16a (Yes at step S109), the feature amount pair determination unit 20 returns to step S101 to repeat the same processing. Then, if the processing is ended for all face feature representative vectors held in the unchecked feature amount holding unit 16a (No at step S109), Processing (1) ends.

Processing (2) will be described next. Processing (2) includes processing of a vector pair stored in the manual-check-requiring feature amount pair holding unit 16c, processing of a face feature representative vector stored in the manual-check-requiring feature amount holding unit 16d, and processing of a face feature representative vector stored in the manual-specifying-requiring feature amount holding unit 16e.

First, the processing of a vector pair stored in the manual-check-requiring feature amount pair holding unit 16c will be described below with reference to the flowchart in FIG. 15. When this processing is started, the label check unit 21 takes one vector pair out of the manual-check-requiring feature amount pair holding unit 16c (step S201). Then, the label check unit 21 presents, to the user, a face image and a common label related to each of the two face feature representative vectors of the vector pair and checks whether a correct label is assigned to each face feature representative vector (step S202). For example, the user checks whether the presented face images belong to an identical person. When the presented face images belong to an identical person, the user checks whether the common label is the name of the person. When the presented face images belong to different persons, the user checks whether the name of which of the persons the common label indicates.

If it is determined that a correct label is assigned to each face feature representative vector of the vector pair (Yes at step S202), the label check unit 21 stores each face feature representative vector of the vector pair in the checked feature amount holding unit 16b (step S203). On the other hand, if it is determined that a correct label is not assigned to at least one of the face feature representative vectors of the vector pair (No at step S202), the label check unit 21 stores the face feature representative vector to which a correct label is not assigned in the manual-check-requiring feature amount holding unit 16d (step S204).

Thereafter, the label check unit 21 determines whether any unprocessed vector pair remains in the manual-check-requiring feature amount pair holding unit 16c (step S205). If any unprocessed vector pair remains in the manual-check-requiring feature amount pair holding unit 16c (Yes at step S205), the label check unit 21 returns to step S201 to repeat the same processing. Then, if the processing is ended for all vector pairs held in the manual-check-requiring feature amount pair holding unit 16c (No at step S205), the series of processes ends.

Subsequently, the processing of a face feature representative vector stored in the manual-check-requiring feature amount holding unit 16d will be described below with reference to the flowchart in FIG. 16. When this processing is started, the label check unit 21 takes one face feature representative vector out of the manual-check-requiring feature amount holding unit 16d (step S301). Then, the label check unit 21 presents, to the user, a face image and a label related to the face feature representative vector, and checks whether a correct label is assigned to the face feature representative vector (step S302). For example, the user checks whether the presented label is the name of a person of the face image.

If it is determined that a correct label is assigned to the face feature representative vector (Yes at step S302), the label check unit 21 stores the face feature representative vector in the checked feature amount holding unit 16b (step S305). On the other hand, if it is determined that a correct label is not assigned to the face feature representative vector (No at step S302), the label check unit 21 presents, to the user, a list of main characters corresponding to a moving image from which the face feature representative vector is generated, and checks whether the label candidate corresponding to the face feature representative vector is generated (step S303). For example, the user checks whether the person name of a presented face image is included in the main character list. When the person name of the face image is included in the main character list, the user performs an operation to select the person name.

If the label candidate corresponding to the face feature representative vector is generated, in other words, when the person name of the presented face image is included in the main character list and the user has performed an operation to select the person name of the face image from the main character list (Yes at step S303), the label check unit 21 changes the label of the face feature representative vector in accordance with this user operation (step S304) and stores the face feature representative vector in the checked feature amount holding unit 16b (step S305). On the other hand, if no label candidate corresponding to the face feature representative vector is generated (No at step S303), the label check unit 21 stores the face feature representative vector in the manual-specifying-requiring feature amount holding unit 16e (step S306).

Thereafter, the label check unit 21 determines whether any unprocessed face feature representative vector remains in the manual-check-requiring feature amount holding unit 16d (step S307). If any unprocessed face feature representative vector remains in the manual-check-requiring feature amount holding unit 16d (Yes at step S307), the label check unit 21 returns to step S301 to repeat the same processing. Then, if the processing is ended for all face feature representative vectors held in the manual-check-requiring feature amount holding unit 16d (No at step S307), the series of processes ends.

Subsequently, the processing of a face feature representative vector stored in the manual-specifying-requiring feature amount holding unit 16e will be described below with reference to the flowchart in FIG. 17. When this processing is started, the label check unit 21 takes one face feature representative vector out of the manual-specifying-requiring feature amount holding unit 16e (step S401). Then, the label check unit 21 presents, to the user, a label related to the face feature representative vector and a list of face images corresponding to face feature vectors excluded, from clustering targets, as "outlier vectors" when the face feature representative vector is generated, and changes the face feature vector corresponding to the label in accordance with a user operation (step S402).

Specifically, the label check unit 21 sets, as correction candidates, face feature vectors considered as "outlier vectors" at generation of the face feature representative vector as a processing target and presents a list of face images corresponding to the face feature vectors as correction candidates to the user together with a label assigned to the face feature representative vector as a processing target. In this case, the face images in the list may be sorted so that the face image of a person more distinct in a frame image is positioned at a higher place based on, for example, the size of the face image and how much the face is squarely imaged. The user performs an operation to select, from the face image list, the face image of a person matching the person name of the presented label. The label check unit 21 changes, in accordance with this user operation, the face feature vector corresponding to the label presented to the user. Then, the label check unit 21 stores the changed face feature vector in the checked feature amount holding unit 16b (step S403).

Thereafter, the label check unit 21 determines whether any unprocessed face feature representative vector remains in the manual-specifying-requiring feature amount holding unit 16e (step S404). If any unprocessed face feature representative vector remains in the manual-specifying-requiring feature amount holding unit 16e (Yes at step S404), the label check unit 21 returns to step S401 to repeat the same processing. Then, if the processing is ended for all face feature representative vectors held in the manual-specifying-requiring feature amount holding unit 16e (No at step S404), the series of processes ends.

As described above, according to the present embodiment, since it is checked whether automatic assigning of a label to a feature amount is processed as expected, and manual check and correction by the user are performed when the automatic assigning is potentially not processed as expected, assigning of a label to a feature amount can be more accurately performed.

Fifth Embodiment

The following describes a fifth embodiment. The present embodiment is the above-described fourth embodiment having an additional function for efficiently performing manual check and correction by the user. The other functions are same as those of the fourth embodiment described above, and thus only any function unique to the present embodiment will be described below.

In the above-described fourth embodiment, manual check and correction by the user are performed when it is determined that a face feature representative vector is highly unlikely to belong to a main character as a result of calculation of the error score of a vector pair. However, a new vector pair, the error score of which is equal to or lower than the threshold value, can be established upon addition of a new content 51 (moving image) to the content DB 50 in some cases. In such a case, manual check and correction by the user, which are needed before the addition of the new content 51 are not needed.

Accordingly, when the new content 51 is added, it is effective to perform the same processing again, but a long processing time is needed to perform the same processing again for all contents 51 in the content DB 50. Thus, in the present embodiment, feature amounts that need manual check and correction by the user are narrowed down in a short processing time by performing the processing of the fourth embodiment again for a feature amount generated from the new content 51 and a feature amount that needs manual check and correction by the user.

Figure 18:
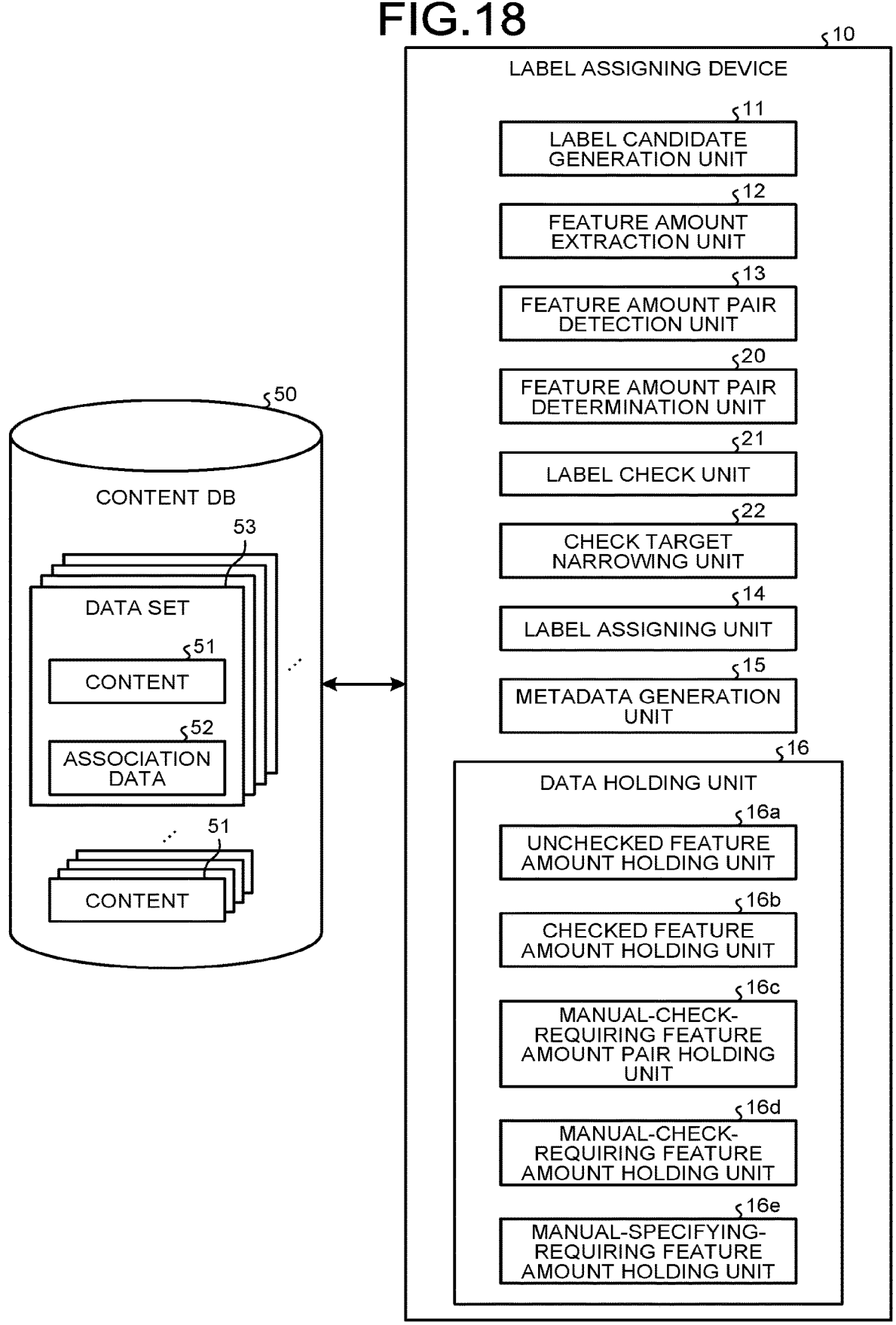
FIG. 18 is a block diagram illustrating an exemplary functional configuration of the label assigning device according to a fifth embodiment.

FIG. 18 is a block diagram illustrating an exemplary functional configuration of the label assigning device 10 according to the fifth embodiment. The label assigning device 10 according to the present embodiment includes a check target narrowing unit 22 in addition to the configuration of the fourth embodiment illustrated in FIG. 13.

When the new content 51 is added to the content DB 50, the check target narrowing unit 22 uses feature amounts extracted from the new content 51 to narrow down, feature amounts constituting a feature amount pair having the error score exceeding the threshold value, or feature amounts for which whether a correct label is assigned needs to be checked among feature amounts not constituting a feature amount pair.

The following describes an outline of processing in the present embodiment. In the present embodiment, first, the feature amount pair determination unit 20 executes Processing (1) of the fourth embodiment described above and stores any face feature representative vector that needs manual check and correction by the user in the manual-check-requiring feature amount pair holding unit 16c and the manual-check-requiring feature amount holding unit 16d. In addition, the feature amount pair determination unit 20 generates a new face feature representative vector by executing the processing of the above-described first embodiment on the moving image added as a new content 51 in the content DB 50.

Subsequently, the check target narrowing unit 22 stores, in the unchecked feature amount holding unit 16a, the new face feature representative vector generated from the moving image added as a new content 51, the face feature representative vector held in the manual-check-requiring feature amount pair holding unit 16c, and the face feature representative vector held in the manual-check-requiring feature amount holding unit 16d. Thereafter, the feature amount pair determination unit 20 executes again Processing (1) of the fourth embodiment described above to narrow down face feature representative vectors stored in the manual-check-requiring feature amount pair holding unit 16c and the manual-check-requiring feature amount holding unit 16d, in other words, face feature representative vectors that need manual check and correction by the user.

As described above, according to the present embodiment, when a new content 51 is added, feature amounts that need manual check and correction by the user are narrowed down by using feature amounts extracted from the new content, and thus manual check and correction by the user can be efficiently performed.

Supplementary Description

For example, the label assigning device 10 of each of the embodiments described above may be implemented by a computer program product configured to operate in an execution environment using the hardware of a typical computer. In this case, the above-described functional components (the label candidate generation unit 11, the feature amount extraction unit 12, the feature amount pair detection unit 13, the label assigning unit 14, the metadata generation unit 15, the data holding unit 16, the label candidate correction unit 17, the teaching target selection unit 18, the operation reception unit 19, the feature amount pair determination unit 20, the label check unit 21, and the check target narrowing unit 22) of the label assigning device 10 are achieved through cooperation of hardware and software (computer program).

Figure 19:
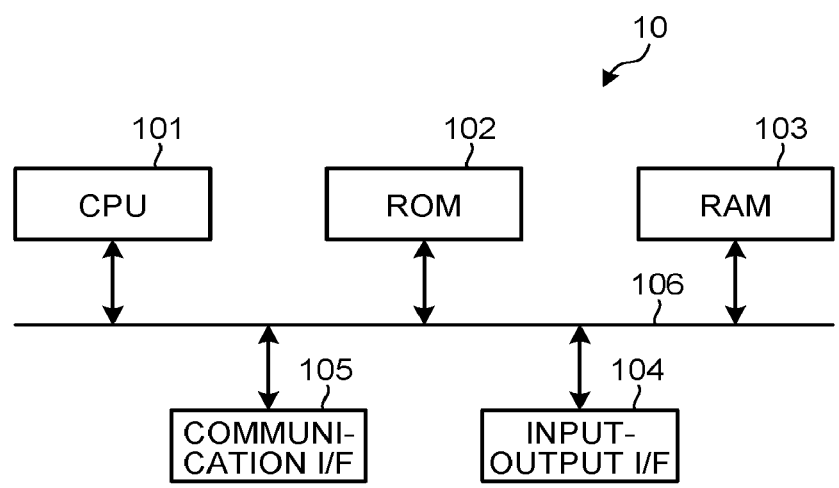
FIG. 19 is a block diagram illustrating an exemplary hardware configuration of the label assigning device.

FIG. 19 is a block diagram illustrating an exemplary hardware configuration of the label assigning device 10. As illustrated in, for example, FIG. 19, the label assigning device 10 may have a hardware configuration using a typical computer including a processor circuit such as a central processing unit (CPU) 101, storage devices such as a read only memory (ROM) 102 and a random access memory (RAM) 103, an input-output I/F 104 connected with a display panel and various operation devices, a communication I/F 105 connected with a network to perform communication, and a bus 106 connecting the components.

The computer program executed on the above-described hardware configuration is, for example, recorded as a file of an installable or executable format in a computer-readable recording medium such as a compact disc read only memory (CD-ROM), a flexible disk (FD), a compact disc recordable (CD-R), or a digital versatile disc (DVD) and provided as a computer program product. The computer program executed on the above-described hardware configuration may be stored on a computer connected with a network such as the Internet and provided by downloading through the network. The computer program executed on the above-described hardware configuration may be provided and distributed through a network such as the Internet. The computer program executed on the above-described hardware configuration may be incorporated in the ROM 102 or the like in advance and provided.

The computer program executed on the above-described hardware configuration has a module configuration including the functional components of the label assigning device 10. Each above-described component is loaded onto the RAM 103 (main storage) and generated on the RAM 103 (main storage) by, for example, the CPU 101 (processor circuit) reading the computer program from the above-described recording medium and executing the computer program. The functional components of the label assigning device 10 may be achieved across a plurality of computers. Some or all of the above-described functional components may be achieved by using dedicated hardware such as an application specific integrated circuit (ASIC) or a field-programmable gate array (FPGA).

According to at least one embodiment described above, a label can be automatically assigned to a feature amount extracted from a content.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A label assigning device comprising:
one or more hardware processors configured to function as:
a label candidate generation unit configured to generate a label candidate from association data that is associated with a content;
a feature amount pair detection unit configured to select a first content and a second content having only one common label candidate that is generated from both first association data associated with the first content and second association data associated with the second content and is not assigned to any feature amount, and detect a feature amount pair that is a combination of feature amounts having a highest similarity among combinations of a feature amount that is extracted from the first content and to which no label is assigned, and a feature amount that is extracted from the second content and to which no label is assigned; and
a label assigning unit configured to assign, as a label, the common label candidate to each feature amount constituting the feature amount pair.

2. The label assigning device according to claim 1, wherein when a distance between a feature amount extracted from a third content and each feature amount constituting the feature amount pair is equal to or smaller than a threshold value, the label assigning unit assigns, to the feature amount extracted from the third content, a label that is common to the label of each feature amount constituting the feature amount pair.

3. The label assigning device according to claim 1, wherein the one or more hardware processors are further configured to function as a feature amount extraction unit configured to extract a feature amount from a content.

4. The label assigning device according to claim 3, wherein
the feature amount extraction unit clusters feature amount groups extracted from a content and generates a representative feature amount for each cluster, and
the feature amount pair detection unit detects, as the feature amount pair, a combination of representative feature amounts having a highest similarity among combinations of a representative feature amount generated from the first content and a representative feature amount generated from the second content.

5. The label assigning device according to claim 1, wherein the one or more hardware processors are further configured to function as a metadata generation unit configured to generate metadata of a content by using a feature amount to which a label is assigned.

6. The label assigning device according to claim 1, wherein the first content and the second content are generated by dividing one content.

7. The label assigning device according to claim 1, wherein the one or more hardware processors are further configured to function as a label candidate correction unit configured to generate a meaning vector of the label candidate and commonalize label candidates having a similarity equal to or larger than a threshold value between meaning vectors.

8. The label assigning device according to claim 1, wherein the one or more hardware processors are further configured to function as:
a teaching target selection unit configured to select, when a plurality of common label candidates is present and determination of a relation between one label candidate and a feature amount determines a relation between another label candidate and a feature amount, the one label candidate as a teaching target; and
an operation reception unit configured to receive a user operation that teaches the relation between the label candidate as the teaching target and the feature amount.

9. The label assigning device according to claim 1, wherein the one or more hardware processors are further configured to function as a feature amount pair determination unit configured to calculate an error score of the feature amount pair and determine whether the feature amount pair represents an identical target based on the calculated error score.

10. The label assigning device according to claim 9, wherein the one or more hardware processors are further configured to function as a label check unit configured to check, with a user, whether a correct label is assigned to each feature amount constituting the feature amount pair having the error score exceeding a threshold value, or a feature amount that is incapable of constituting the feature amount pair.

11. The label assigning device according to claim 10, wherein the one or more hardware processors are further configured to function as a check target narrowing unit configured to narrow down, when a new content is added, by using a feature amount extracted from the new content, feature amounts necessitating checking of whether a correct label is assigned among feature amounts constituting a feature amount pair having the error score exceeding the threshold value, or feature amounts that are incapable of constituting the feature amount pair.

12. The label assigning device according to claim 1, wherein the content is any one of a moving image, a stationary image, voice, and sensor data.

13. The label assigning device according to claim 1, wherein the association data is text data assigned to the content in advance or text data obtained by performing given processing on the content.

14. A label assigning method implemented by a computer, the method comprising:
generating a label candidate from association data that is associated with a content;
selecting a first content and a second content having only one common label candidate that is generated from both first association data associated with the first content and second association data associated with the second content and is not determined as a label of any feature amount;
detecting a feature amount pair that is a combination of feature amounts having a highest similarity among combinations of a feature amount that is extracted from the first content and for which no label is determined, and a feature amount that is extracted from the second content and for which no label is determined; and
determining, as a label of each feature amount constituting the feature amount pair, the common label candidate.

15. A computer program product having a non-transitory computer readable medium including programmed instructions, wherein the instructions, when executed by a computer, cause the computer to perform:
generating a label candidate from association data that is associated with a content;
selecting a first content and a second content having only one common label candidate that is generated from both first association data associated with the first content and second association data associated with the second content and is not determined as a label of any feature amount;

detecting a feature amount pair that is a combination of feature amounts having a highest similarity among combinations of a feature amount that is extracted from the first content and for which no label is determined, and a feature amount that is extracted from the second content and for which no label is determined; and determining, as a label of each feature amount constituting the feature amount pair, the common label candidate.

\* \* \* \* \*